US008825581B2

(12) United States Patent
Duftler et al.

(10) Patent No.: US 8,825,581 B2
(45) Date of Patent: Sep. 2, 2014

(54) SIMPLIFYING A GRAPH OF CORRELATION RULES WHILE PRESERVING SEMANTIC COVERAGE

(75) Inventors: Matthew J. Duftler, Yorktown Heights, NY (US); Szabolcs Rozsnyai, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/608,813

(22) Filed: Sep. 10, 2012

(65) Prior Publication Data

US 2014/0074764 A1 Mar. 13, 2014

(51) Int. Cl.
*G06N 5/02* (2006.01)

(52) U.S. Cl.
CPC . *G06N 5/02* (2013.01); *G06N 5/022* (2013.01)
USPC .............................................. 706/47; 706/45

(58) Field of Classification Search
None
See application file for complete search history.

(56) References Cited

U.S. PATENT DOCUMENTS

| 6,697,791 | B2 | 2/2004 | Hellerstein et al. |
| 7,647,293 | B2 | 1/2010 | Brown et al. |
| 7,711,670 | B2 | 5/2010 | Roediger |
| 8,065,319 | B2 | 11/2011 | Ding et al. |
| 2010/0114629 | A1 | 5/2010 | Adler et al. |
| 2011/0282748 | A1 | 11/2011 | Ciurea |
| 2011/0289588 | A1 | 11/2011 | Sahai et al. |

OTHER PUBLICATIONS

Zweig, On Local Behavior and Global Structures in the Evolution of Complex Networks, Doctoral Thesis, Eberhard-Karls-Universitat Tubingen, 2007, pp. 1-168.*
Park, Architectures and Methods for Energy-Efficient Querying and Indexing in Wireless Sensor Networks, Doctoral Thesis, University of Texas at Arlington, 2008, pp. 1-120.*
Rozsnyai et al., "Automated Correlation Discovery for Semi-Structured Business Processes," IEEE 27th International Conference on Data Engineering Workshops (ICDEW), 2011.
Jiang, "Data Quality By Design: A Goal-Oriented Approach", Doctor of Philosophy thesis, University of Toronto, 2010.
Chen et al., "Complex Event Processing using Simple Rule-based Event Correlation Engines for Business Performance Management," Proceedings of the 8th.
IEEE International Conference on E-Commerce Technology and the 3rd IEEE International Conference on Enterprise Computing, E-Commerce, and E-Services (2006).
Stojanovic et al., "The role of ontologies in autonomic computing systems," IBM Systems journal, vol. 43 #3, 2004.

* cited by examiner

*Primary Examiner* — Wilbert L Starks
(74) *Attorney, Agent, or Firm* — William Stock

(57) ABSTRACT

A method, system and computer program product for simplifying a plurality of correlation rules of a graph. The method includes the steps of: receiving correlation rules; creating an undirected graph; removing redundant edges from the undirected graph; splitting nodes in the undirected graph; replacing a probability that an edge that connects two nodes to a seed value; modifying the seed value by adding a first value to said seed value and adding a second value to the first value; determining a maximum modified seed value; adding the maximum modified seed value to a probability that the uncertain edge connects two nodes; removing any temporary certain edge; and running a minimum spanning tree algorithm on said modified undirected graph.

18 Claims, 19 Drawing Sheets

SIMPLIFYING A GRAPH OF CORRELATION RULES WHILE PRESERVING SEMANTIC COVERAGE

BACKGROUND OF THE INVENTION

The present invention relates to the event correlation rules that exist in arbitrary data sources. More specifically, a technique for reducing the number of correlation rules without impacting the semantic correlation coverage of the rules that remain.

Systems that support today's globally distributed, rapidly changing and agile businesses are steadily growing in size as well as complexity. They are becoming increasingly federated, loosely coupled, distributed and at the same time generating a huge number of events ranging from record entries representing business activities to more technical events at various levels of granularity.

As a result, a method of reducing the complexity of the rules for these systems is needed.

SUMMARY OF THE INVENTION

One aspect of the present invention provides a method of simplifying a plurality of correlation rules of a graph, including: receiving correlation rules; creating an undirected graph using the correlation rules; removing at least one edge from the undirected graph if (i) the edge is an uncertain edge connecting a first node and second node and (ii) the first node and the second node are connected by a first certain edge; adding a fifth node to the undirected graph if (i) a third node is connected to a fourth node by a second certain edge and (ii) the third node is connected to at least one other node by uncertain edges; replacing one of the uncertain edges which connects the third node to one of the other node with a temporary uncertain edge which connects the fifth node to the other node; creating a temporary certain edge which connects the fifth node to the fourth node; for each certain edge or temporary certain edge, changing the certain edge or temporary certain edge to a modified certain edge by (i) replacing a probability that the certain edge or the temporary certain edge connects two nodes to a seed value, (ii) modifying the seed value by adding a first value to the seed value and (iii) adding a second value to the first value; determining a maximum modified seed value where the maximum modified seed value was assigned to the modified certain edge; changing each uncertain edge and temporary uncertain edge to a modified uncertain edge by adding the maximum modified seed value to a probability that the uncertain edge or the temporary uncertain edge connects two nodes; removing the modified temporary certain edge; and running a minimum spanning tree algorithm on the modified undirected graph; where at least one of the steps is carried out using a computer device.

Another aspect of the present invention provides a system for simplifying a plurality of correlation rules of a graph, including: a receiving module configured to receive the correlation rules; a first creating module configured to create an undirected graph using the correlation rules; a first removing module configured to remove at least one edge from the undirected graph if (i) the at least one edge is an uncertain edge connecting a first node and second node and (ii) the first node and said second node are connected by a first certain edge; an adding module configured to add a fifth node to the undirected graph if (i) a third node is connected to a fourth node by a second certain edge and (ii) the third node is connected to at least one other node by uncertain edges; a replacing module configured to replace one of the uncertain edges which connects said third node to one of the other node with a temporary uncertain edge which connects the fifth node to one of the other nodes; a second creating module configured to create a temporary certain edge which connects the fifth node to the fourth node; a first changing module configured to change, for each certain edge or temporary certain edge, the certain edge or temporary certain edge to a modified certain edge by (i) replacing a probability that the certain edge or the temporary certain edge connects two nodes to a seed value, (ii) modifying the seed value by adding a first value to the seed value and (iii) adding a second value to the first value; a determining module configured to determine a maximum modified seed value where the maximum modified seed value was assigned to the modified certain edge; a second changing module configured to change each uncertain edge and temporary uncertain edge to a modified uncertain edge by adding the maximum modified seed value to a probability that the uncertain edge or the temporary uncertain edge connects two nodes; a second removing module configured to remove the modified temporary certain edge; and a running module configured to run a minimum spanning tree algorithm on the modified undirected graph.

Another aspect of the present invention provides a non-transitory computer readable storage medium tangibly embodying a computer readable program code having computer readable instructions which when implemented, cause a computer to carry out the steps of a method including: receiving correlation rules; creating an undirected graph using the correlation rules; removing at least one edge from the undirected graph if (i) the edge is an uncertain edge connecting a first node and second node and (ii) the first node and the second node are connected by a first certain edge; adding a fifth node to the undirected graph if (i) a third node is connected to a fourth node by a second certain edge and (ii) the third node is connected to at least one other node by uncertain edges; replacing one of the uncertain edges which connects the third node to one of the other node with a temporary uncertain edge which connects the fifth node to the other node; creating a temporary certain edge which connects the fifth node to the fourth node; for each certain edge or temporary certain edge, changing the certain edge or temporary certain edge to a modified certain edge by (i) replacing a probability that the certain edge or the temporary certain edge connects two nodes to a seed value, (ii) modifying the seed value by adding a first value to the seed value and (iii) adding a second value to the first value; determining a maximum modified seed value where the maximum modified seed value was assigned to the modified certain edge;

changing each uncertain edge and temporary uncertain edge to a modified uncertain edge by adding the maximum modified seed value to a probability that the uncertain edge or the temporary uncertain edge connects two nodes; removing the modified temporary certain edge; and running a minimum spanning tree algorithm on the modified undirected graph; where at least one of the steps is carried out using a computer device.

DETAILED DESCRIPTION OF THE PREFERRED EMBODIMENTS

Figure 1:
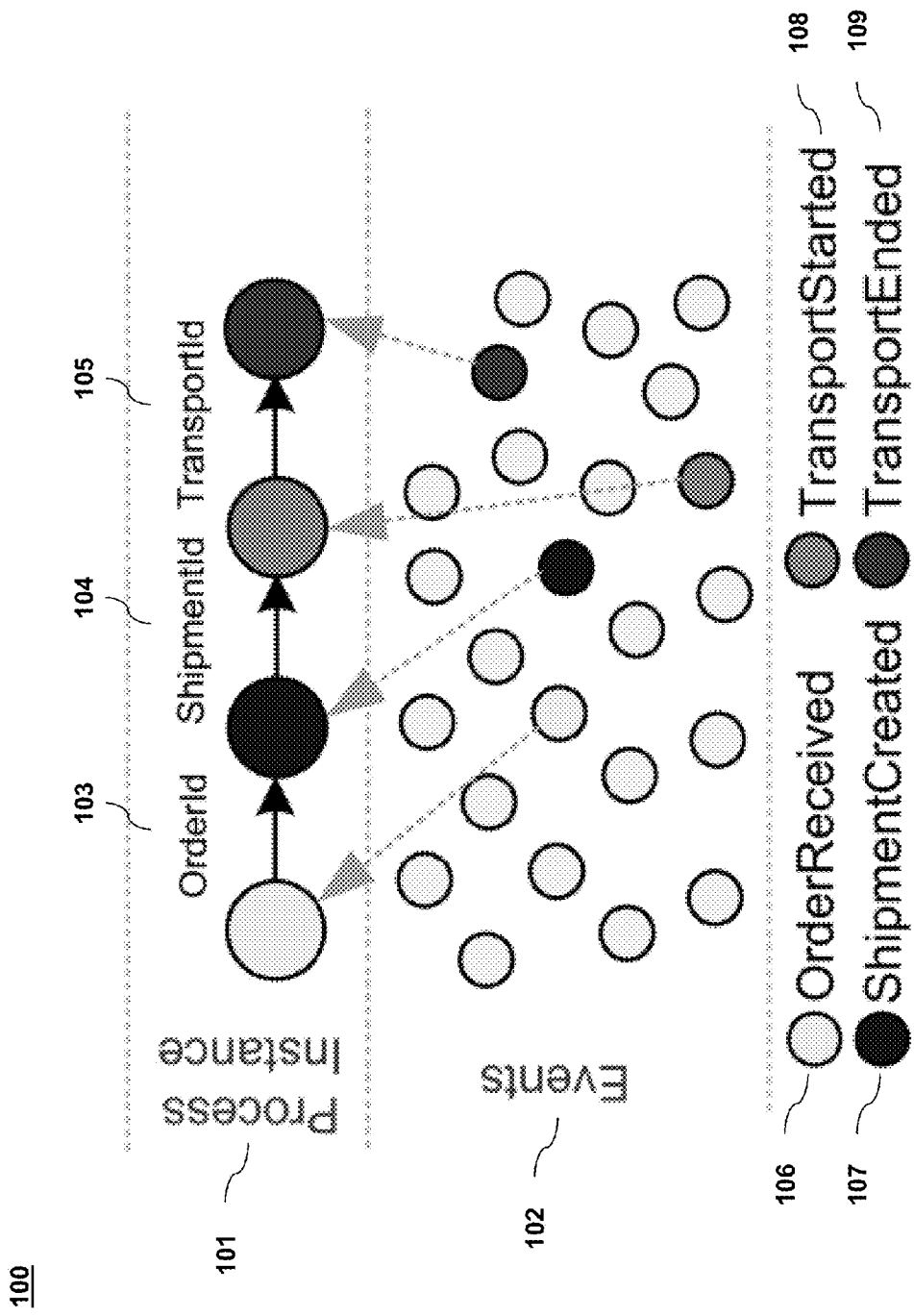
FIG. 1 shows an example of an instance of a process according to an embodiment of the present invention.

Systems that support today's globally distributed, rapidly changing and agile businesses are steadily growing in size as well as complexity. They are becoming increasingly federated, loosely coupled, distributed and at the same time generating a huge number of events ranging from record entries representing business activities to more technical events at various levels of granularity. Industries such as healthcare, insurance and banking have witnessed an explosion in the growth of processes that has been fuelled by the advent of such systems.

Monitoring such processes is useful because it enables a variety of business applications such as process discovery, analytics, verification and process improvement. Accomplishing this is an important research challenge. Such processes could be implemented on diverse event-driven architectures, where none of the components have to be aware of each other and interactions between components are driven by events in an asynchronous fashion. Creating a unified view of such processes, also referred in literature as composite business applications, is a difficult problem. Not every event contains a unified process instance identifier for creating an end-to-end view of the underlying process. In certain scenarios, events are also transformed or aggregated during execution steps so that identifiers that relate events to process instances or to each other become extremely hard to track. This is a key problem that arises when tracking process instances across various system and application layers. In fast changing environments where business processes are executed across a wide range of distributed systems it is difficult to trace process instances as the relationships of events must be explicitly known and defined. Furthermore, supposedly isolated process instances, a transport coordination process for example, can be related to other processes such as the order management and invoicing process. The attributes that bridge these distinct processes, however, can only be found once the instances of these processes have been isolated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An important concept in event processing is event correlation which is linking event instances based on their payload values. The first step towards isolating a process instance in the scenarios the present invention is targeting involves correlation of events generated by heterogeneous and distributed systems. This allows the present invention to isolate and track end-to-end instances of a given business process. The problem of correlating events has been addressed in the past for the purposes of integrating large and complex data sources. In this area the task of matching schemas (relational database schemas for instance) for the purposes of tracking an end-to-end process instance has been identified as a very time-consuming and labor intensive process that requires tool-support and automation. Consequently a significant amount of research effort has been devoted to information retrieval, knowledge representation, schema mapping and translation as well as integration for tracking process instances. Extensive work has also been conducted in the domain of data integration and exchange motivated by the requirements for processes such as Extract Transform Load (ETL) processes in data warehousing. In data warehousing, an ETL process requires the extraction of data from various sources and the transformation of the data to match a corresponding target schema. Such data exchange scenarios require extensive knowledge about the semantics of data structures in order to convert messages from a source schema to a target schema. Existing work devoted to deriving relationships between data elements for the purposes of data exchange has a strong focus on foreign-key relation-ships and assumes relational data (i.e. normalized). Finding and defining relationships (correlations) in an arbitrary and non-normalized data space has thus far received little attention, and is the focus of the present invention.

An embodiment of the present invention can automatically derive correlations from arbitrary sources of data. A correlation, in the context of the present invention, is a set of rules that define which attribute(s) form a relationship between events. This type of correlation is to a certain extent comparable to foreign-key relationships known from the relational world. An important difference, however, is that the present invention does not assume that events are grouped together in a normalized schema and does not assume that any information on meta-data that describes an event's attributes is available to the present invention. An embodiment of the present invention presents a method to discover event correlations and a method to reduce the number of correlation rules while maintaining their semantic correlation coverage.

The discovered correlation rules produced by the present invention can be used either during runtime to group related events together, such as events belonging to a process instance or to create a graph of relationships that enables querying and traversing relationship paths.

A correlation describes the relationship between two events and defines a collection of semantic rules to specify how certain events are related to each other. Correlations are defined through specifying correlating attributes between event types. The ability to define relationships between events is an important component in event processing applications such as event-driven rules. Such applications allow the detection of business situations in order to trigger automatic responses such as early warnings to prevent damage, loss or excessive cost, and provide alerts to exploit time-critical business opportunities. Correlations are also an important aspect for event retrieval systems, pattern discovery and event mining. A definition of a correlation between event types is can be called a correlation rule. For instance, the following expressions A.x=B.y represents a correlation rule between the event types A and B over their attributes x and y. Single correlation rules are typically not capable of isolating specific patterns that are of interest. Therefore, it is necessary to combine several correlation rules in order to be able to define a correlation that includes all events that share a relationship in a certain context. The context might be, for example, the instance of a process, as demonstrated in the transportation process 101 (illustrated in an example in FIG. 1), that is executed across different systems and thus produces various events 102. If a user has enough knowledge about the underlying systems and events he or she can easily express the correlation rules as:

---

OrderReceived(106).OrderId(103) = ShipmentCreated(107).OrderId(103)
ShipmentCreated(107).ShipmentId(104) = TransportStarted(108).-
ShipmentId(104)

```
TransportStarted(108).TransportId(105) = TransportEnded(109).-
TransportId(105)
```

This allows a correlation engine within an embodiment of the present invention to isolate a desired process instance. In the above example, specific process instances are isolated. Events, however, might share all kinds of relationships that can be expressed. A user or component (e.g. a rule engine) might not always be interested in process instances, but in certain dimensions of events such as in the case of a correlation that groups all related events together if they have the same customer (orders placed by the same customer). Such a correlation would enable another component to continuously calculate the average order volume. Correlation rules can be defined based on a user's objectives. Therefore a correlation discovery algorithm can be a means for the present invention to group events via correlation rules.

Previous work has separated correlations into two major groups—primal and bridged correlations. The primal correlation defines direct correlation relationships between event types and their attributes. The bridged correlation extends this model by allowing the definition of correlations between several primal correlations. This type of correlation allows forming indirect relationships between events through defining bridging attributes between primal sets of correlations.

Figure 2:
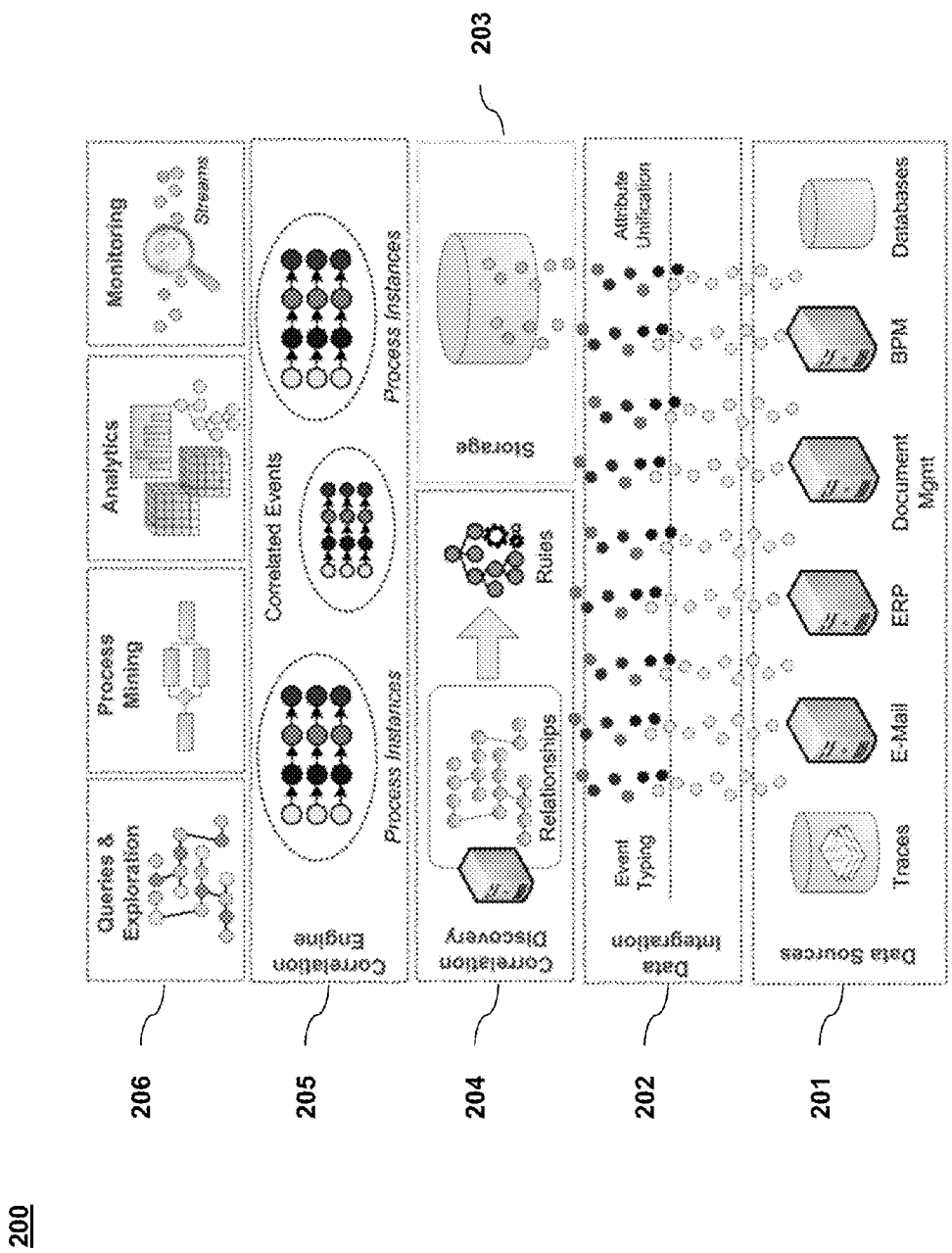
FIG. 2 shows a conceptual overview and context of correlation discovery and its applications according to an embodiment of the present invention.

FIG. 2 gives a conceptual overview and context of correlation discovery and its applications according to an embodiment of the present invention.

Data Sources (201). The bottom layer represents event processing source systems, producing a wide range of artifacts (events, records, logs, etc) from different domains at various levels of granularity.

Data Integration (202). The data sources produce events that represent activities or resources associated to processes and can be consumed by applications such as process analytics. Such events can be in different formats (XML, PDF, JSON, CSV, etc) and with various structures (XSD, column semantics of CSV files, etc). Furthermore, the data sources are constantly subject to change. Changes may occur when IT systems are replaced, when data structures are improved, errors are fixed or new components are introduced that add additional data. Connecting systems directly with the source is therefore rarely an alternative as every change is accompanied with large integration efforts. Therefore data integration creates an abstraction layer over those source events in order to have a stable representation which can be used by applications at higher layers. The advantage is that the abstracted layer does not change, but the data mapping and the extraction of the attributes from the source is altered.

Storage (203). Events extracted from various source systems can be either delegated to real-time event processing components or can be stored for further analysis following the store everything, discover later paradigm. At the time the data is stored it is not necessarily known what a user is specifically going to look for in it. Therefore, it is important to store as much data as possible in its original and unaltered form. This is particularly true for correlation discovery. At a later point in time a user may discover the importance of a specific group of events which had been of little interest in the past. Now such events can be analyzed by a correlation discovery algorithm to detect relationships between them for further use.

Correlation Discovery (204). The correlation discovery algorithm can take events from the storage component and can determine correlations, by calculating a unique combination of statistics on attributes. The output of the correlation discovery algorithm can be correlation rules that express how certain events are related to each other. Those correlations can either isolate process instances (e.g. an Order Process) or certain dimensions (by Customer, by Product).

Correlation Engine (205). A correlation engine can use the previously discovered and defined correlation rules during runtime to either group related events together or create a graph of relationships by connecting events through their shared dimensional relationships. A correlation engine can also apply the correlation rules on a storage system containing historical events to create a graph of relation-ships that then can be used later for analytical purposes.

Applications (206). Correlated events can have several applications according to an embodiment of the present invention. Events correlated at runtime might be used in monitoring applications or event-driven rules to detect exceptional situations and raise alerts. Another application is process mining. Process mining algorithms require historical traces of process instances from which they can derive a process model. Correlation rules can be applied to execution traces before applying a mining algorithm to isolate the process instances that are of interest. Correlated process execution instance traces can then be pro-vided as input to the mining algorithms. Correlations can lead to graphs of relationships that can be utilized to speed up queries if events are stored. It would be possible to traverse through the graph of relations by accessing the various references that are represented by correlations. Correlations are particularly useful for features that re-quire interaction, analysis and exploration of events.

The correlation discovery algorithm can generate a set of correlation rules that reflect valid correlations between events according to an embodiment of the present invention. The complete combination of rules do not always isolate process instances or specific dimensions of relationships between events such as for example grouping related events together if they have the same customer. A user must apply his or her domain knowledge and interest to group correlation rules so that a correlation engine is capable of creating a network of relationships that keeps track of correlated events for event processing purposes such as continuously calculating statistics, observing patterns and reacting to certain situations. Therefore, an embodiment of the present invention introduces the concept of aggregation nodes to facilitate grouping correlation rules to represent certain aspects of an application that may be of interest to a user. Aggregation rules also enable efficient analytics and improve the ease of use and performance when querying, browsing and filtering events.

Figure 3:
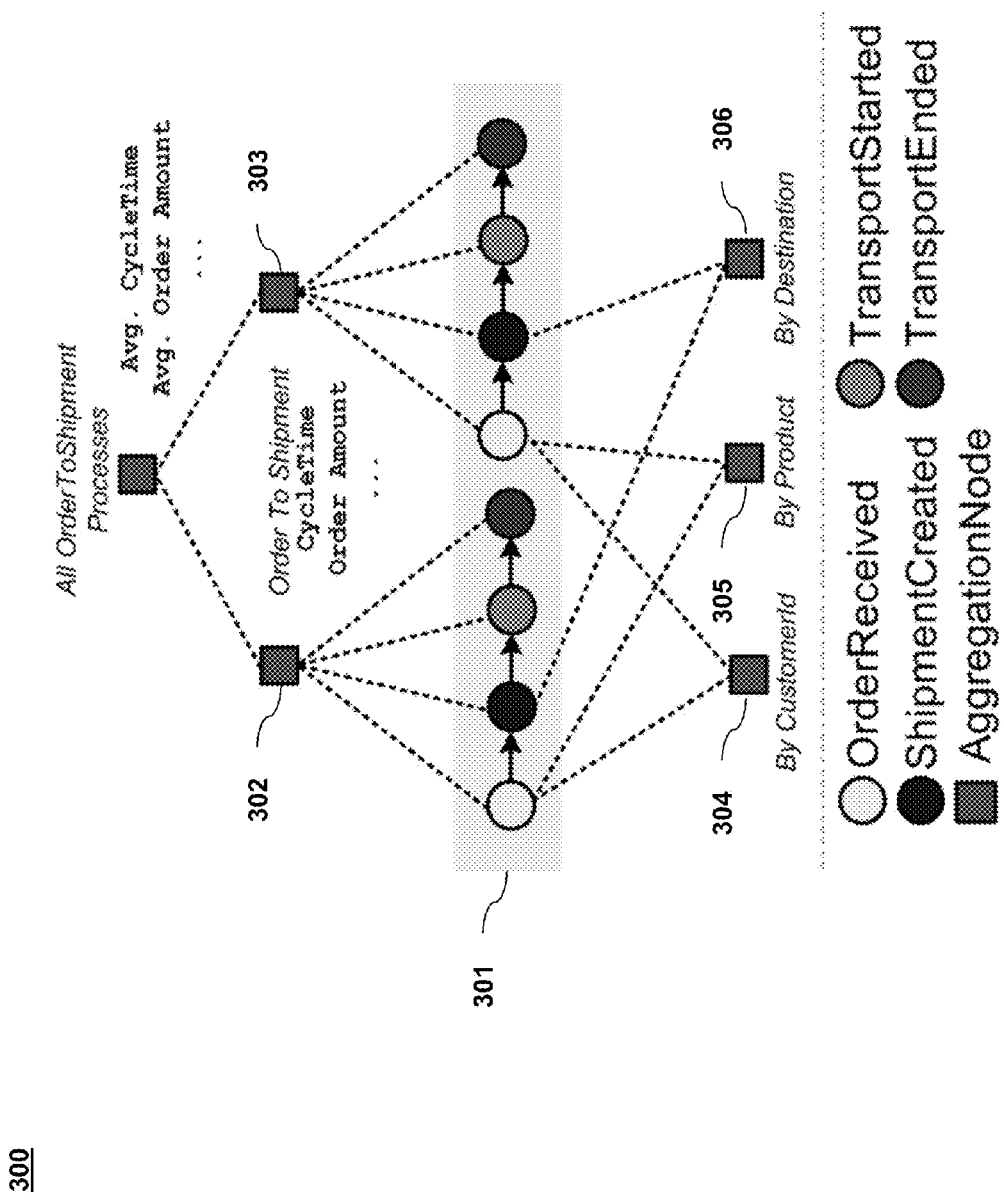
FIG. 3 illustrates a data structure that can be applied to organize correlated events with such aggregation nodes according to an embodiment of the present invention.

FIG. 3 illustrates a data structure that can be applied to organize correlated events with such aggregation nodes according to an embodiment of the present invention. For clarity the middle layer 301 in FIG. 3 shows a stream of events that are ordered. The events share a directed correlation.

```
OrderToShipment → {
OrderReceived.OrderId = ShipmentCreated.OrderId,
ShipmentCreated.ShipmentId = TransportStarted.ShipmentId,
TransportStarted.TransportId = TransportEnded.TransportId
}
```

The direction can be introduced by the correlation engine based either on chronological order or on another defined causal constraint. Each set of correlation rules gets an identifier assigned which can be used to generate an aggregation node such as the OrderToShipment. For every group of events that matches a group of correlation rules an aggregation node is created that references each event of the subset.

In the transportation example shown in FIG. 3 there are two OrderToShipment aggregation nodes 302 and 303 because there are two isolated groups of process instances. Such aggregation nodes can be used as a constraint in a query when the user wants to restrict the search space only to groups of correlated events that belong to the OrderToShipment. Aggregation nodes also help to create a logical grouping and enable easier querying when using the data in interactive visualizations as the related events already provide connections and do not need extra queries. Furthermore aggregation nodes can contain attributes that can contain calculated statistics of the lower level such as the CycleTime 304 or the OrderAmount 305.

By leveraging this concept of representing correlations, it is also possible to create higher level aggregations that include several lower level aggregation nodes according to an embodiment of the present invention. Statistics can be aggregated to provide information over all related events. For instance, in the above example the All OrderToShipment Processes aggregation node contains the average values (Avg. CycleTime, Avg. Order Amount) of all underlying processes. Dimensional information about events can be created by grouping the corresponding correlation rules, such as in the case for the aggregation nodes By CustomerId 304, by Product 305 or by Destination 306. If the user queries for a particular customer the system could immediately retrieve the By CustomerId aggregation node, which could hold several key statistics (Total Orders, etc.). By retrieving that aggregation node, references to all related orders and thus the order processes are maintained and can be immediately accessed.

A method of correlation discovery comprises at least three stages according to an embodiment of the present invention:

(a) Data Pre-Processing. The first step of the correlation discovery process is to load and integrate the data into a data store (e.g. database, cloud storage, etc) that is then used to calculate statistics and determine correlation candidates.

(b) Statistics Calculation. After the data has been loaded and integrated into the internal representation, various statistics, mainly on attribute values, can be calculated and stored into a fast accessible data structure.

(c) Determining Correlation Candidates. The method of correlation discovery can determine correlation pairs with a certain confidence value based on the statistics calculated in the previous step.

The following sections discuss each step in detail with respect to the transportation scenario introduced in this section.

Data Pre-Processing

Figure 4:
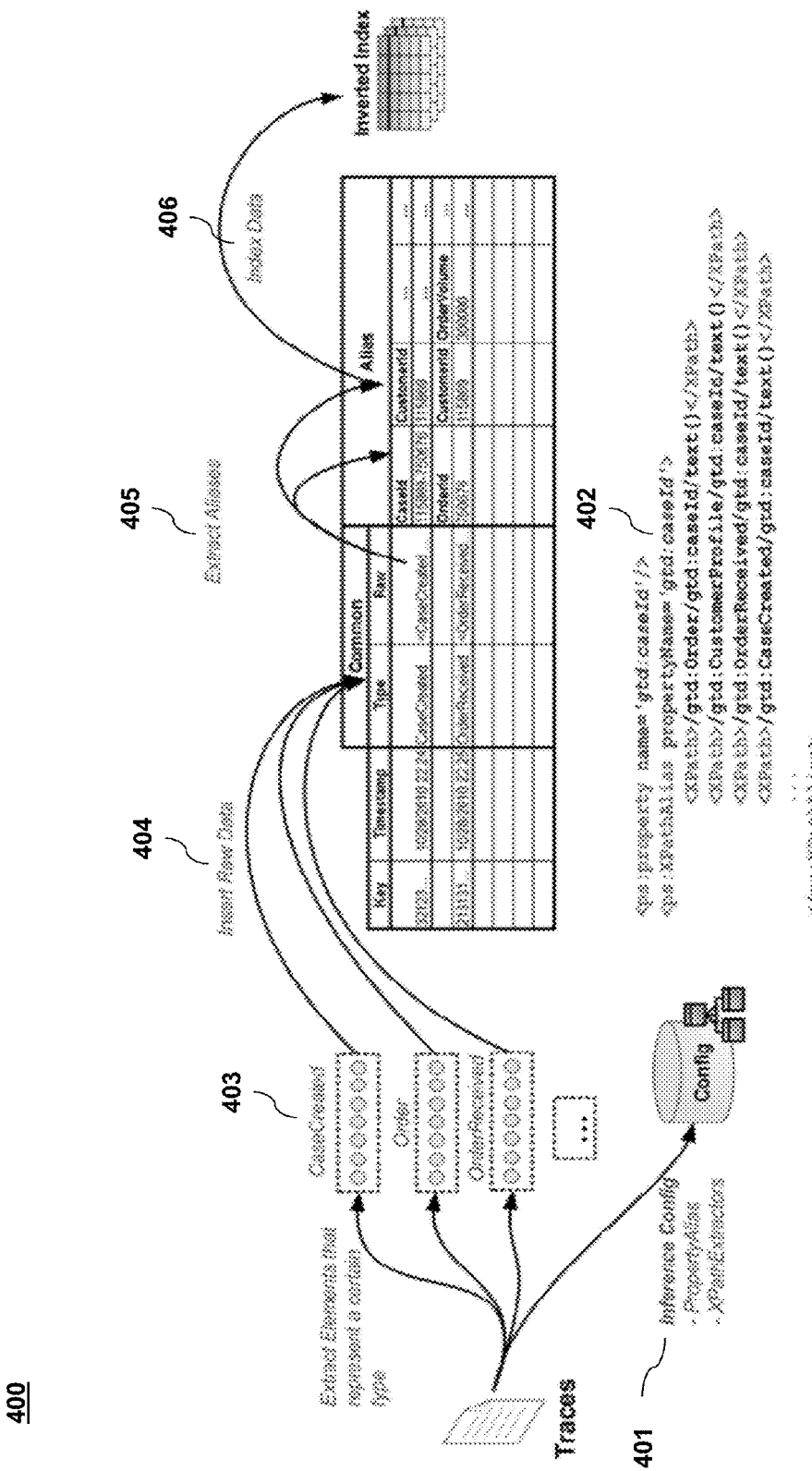
FIG. 4 illustrates a method of correlation discovery, more specifically the data pre-processing portion, according to an embodiment of the present invention.

FIG. 4 illustrates a method of Data Pre-Processing according to an embodiment of the present invention. The first step 401 in FIG. 4 is to infer a configuration setup for data integration and correlation discovery from data that may be present in sample execution traces or directly retrieved from other data sources.

Configuration requires specification of the:

(a) properties (i.e. attributes) that should be extracted from the raw events, and (b) attribute extraction algorithms that should be applied to extract the events attributes.

For the purposes of simplicity these examples focus on data sources represented in XML. Nevertheless, this embodiment of the present invention for detecting correlation identifiers is widely applicable to heterogeneous data sources and not limited to XML. The data sources specified as input are parsed and a property definition is created for each element and its attributes. A property is also referred to as an alias that is a representation of an extracted attribute of an event. Since we assume in this paper that sources are represented in XML, for each property a corresponding XPath expression is derived from the source structure that allows an extraction algorithm to extract the property each time an event is added to the storage.

In situations where an XML element or an attribute is not unique and may exist as a child in other elements, their corresponding XPath expressions are grouped together as shown in the example 402 in FIG. 4. The example 402 in FIG. 4 shows a property definition named gtd:caseId. The element ps:XPathAlias refers to that property and defines a set of XPath expressions. After an event has been loaded into the data store as a record, the system is able to infer a configuration for it which consists of the Property Aliases and XPath extractors. Configuration allows automatic determination of the extraction algorithms which should be applied to extract the attributes of an event. In this example if the document is of a type gtd:Order then the caseId of the document can be extracted and stored explicitly as an attribute.

In the next step 403 in FIG. 4, after the configuration has been generated, the raw event sources (such as event traces) or a sample set of them are loaded into data storage. The loading process is aware of the (semantic) "type" (e.g. it is an Order) of the data and flags data accordingly. In the example depicted in FIG. 4, the type is determined by the top-level XML element names such as CaseCreated, OrderReceived, etc. Other methods may be used to determine the type of an event such as applying information known beforehand about the source or by more sophisticated methods of automatically discovering type characteristics. Regardless of the choice of method, events are separated into groups, clusters or types as the goal is to determine the relationships between those types or clusters of events.

According to an embodiment of the present invention, HBase, an open source, non-relational, distributed database modeled after Google's BigTable can be used. It consists of sorted key-value pairs where a key is a unique identifier and its value spans an arbitrary number of immutable attributes (Step 404 in FIG. 4). These attributes can be grouped together in families such as Common, Alias and Graph. Their structure can be comparable to relational schemas with a major difference being that the attributes are schema-less. This means that there is neither a defined set of attributes nor a data type defined for those attributes. For example a CaseCreated event may contain three attributes while an E-Mail may contain four completely different data types of attributes. This kind of data structure has many advantages in distributed cloud storage systems as tables are always sorted by their key and thus can be easily distributed horizontally over several machines. Further, applying MapReduce jobs (M/R) for analytical or query tasks over huge data sets can significantly boost performance according to an embodiment of the present invention.

The raw event with its (semantic) type can be inserted as-is into the Common family along with a unique identifier as the key. Based on the initial configuration that was created, the attributes can be extracted and stored separately into the Alias family (Step 405 in FIG. 4). In the indexing step (Step 406 in FIG. 4), every extracted value of a raw event can be stored into an inverted index. For each type and attribute a separate index table is created where the value of an attribute becomes the key and the value of the index table holds a list of references to the corresponding records where the key occurs. This enables the calculation of statistics that are needed for correlation discovery. A separate index for each attribute and type can be created.

Statistics Calculation

Figure 5:
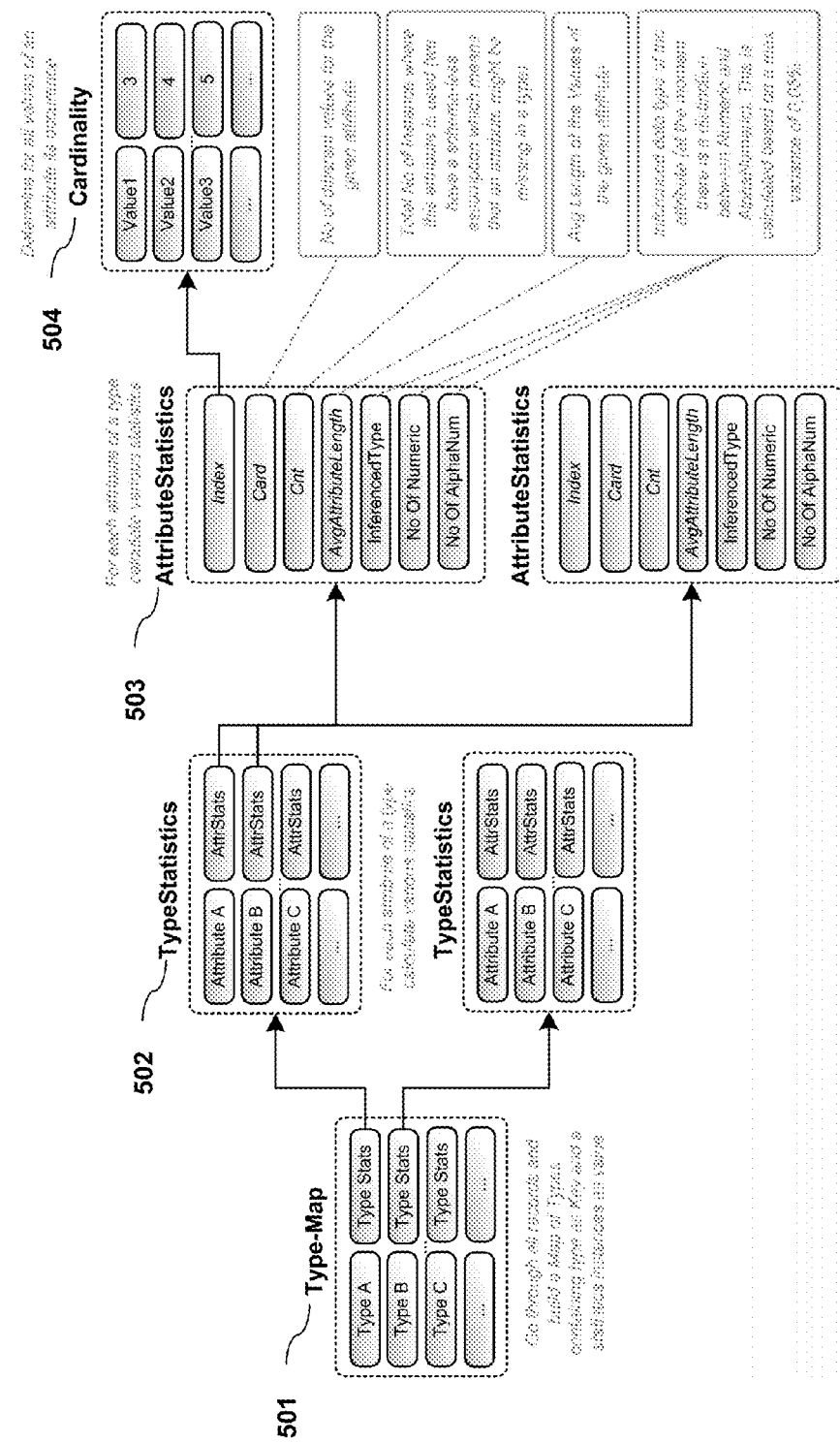
FIG. 5 illustrates a method of statistics calculation according to an embodiment of the present invention.

After the raw events have been loaded and pre-processed the next step is to compute and store various statistics about the events. FIG. 5 illustrates a method of statistics calculation according to an embodiment of the present invention. More specifically, FIG. 5 illustrates the data structure and lists the statistics that need to be calculated for each type and attribute in order to detect correlation candidates according to an embodiment of the present invention. For every event type a type-map TypeStats container (Step 501 in FIG. 5) is created containing all attributes that ever occurred for that type including statistics, referred to as TypeStats (Step 502 in FIG. 5), for each of those contained attributes.

Each TypeStat can contain one or more of the following calculated statistics (Step 503 in FIG. 5):

Attribute Cardinality: Based on the previously created inverted index, the Attribute Cardinality contains a map of each value and how often each of those values occur.

Card: Determines the number of different values for the attribute (cardinality).

Cnt: Represents the total number of instances in which the attribute occurs (count). As the data structure does not work on a defined schema it is possible that the attribute does not occur in every instance.

AvgAttributeLength: Represents the average attribute length of the current attribute. This is an indicator about the potential uniqueness of a value. A long length value may signify that an attribute might be a unique identifier. Unique identifiers such as OrderId are potential attributes that occurs in other types and thus form a correlation. Long attribute lengths may also be misleading since a textual description may be very long and is unique but it is never used for correlating events.

InferencedType: Defines the data type of an attribute. The data type of an attribute is an important characteristic of correlation discovery for the purposes of reducing the problem space of correlation candidates. The chances that a data type would correlate with another attribute given that the data type contains mostly alpha-numeric attributes are very low. We make a distinction between the numeric and alphanumeric attribute data types. This particular characteristic can, how-ever, be extended to significantly reduce the problem space. Time-stamps, for instance, could be filtered out of correlation candidates. The determination of the data type is made with a fault tolerance of 0.9 (e.g. min. 90% of the values must be numeric), and we refer to this as a parameter Phi. We support the following type of distinctions: Numeric or Alphanumeric, Time-stamp/DateTime, Boolean and Descriptiontext.

NoOfNumeric: Depending on the InferencedType this variable contains the number of values that are of numeric type.

NoOfAlphaNum: Depending on the InferencedType this variable contains the number of values that are of type alpha-numeric.

For example, in the transportation scenario introduced earlier, there were four different event types: OrderReceived, ShipmentCreated, Transport-Started and TransportEnded. The following table represents OrderReceived event instances as rows and their attributes as columns.

| DateTime | OrderId | Product | Amount | DeliveryUntil | CustomerId |
|---|---|---|---|---|---|
| 2011-01-01T09:35:52.50 | 166635 | ProductA | 10 | 2011-01-10T23:59:59.00 | 46546546 |
| 2011-01-01T09:40:54.50 | 166636 | ProductB | 2 | 2011-01-10T23:59:59.00 | 41231234 |
| 2011-01-01T09:41:51.30 | 166637 | ProductC | 1 | 2011-01-10T23:59:59.00 | 46123123 |
| 2011-01-01T09:43:32.50 | 166638 | ProductD | 7 | 2011-01-10T23:59:59.00 | 72123123 |
| 2011-01-01T09:43:42.50 | 166639 | ProductA | 2 | 2011-01-10T23:59:59.00 | 12312544 |

From this table, statistics can be calculated, according to an embodiment of the present invention. In this example, the attribute cardinality can contain a map of each value and how often each of these values occur as exemplified in the following table:

| OrderReceived | DateTime | OrderId | Product | Amount | DeliveryUntil | CustomerId |
|---|---|---|---|---|---|---|
| Index | <<Map>> | <<Map>> | <<Map>> | <<Map>> | <<Map>> | <<Map>> |
| Card | 5 | 5 | 4 | 4 | 1 | 5 |
| Cnt | 5 | 5 | 5 | 5 | 5 | 5 |
| AvgAttributeLength | 22 | 6 | 8 | 1.2 | 22 | 8 |
| InferencedType | DateTime | Numeric | Alphanumeric | Numeric | DateTime | Numeric |
| NoOfNumeric | 0 | 5 | 0 | 5 | 0 | 5 |
| NoOfAlphaNumeric | 0 | 0 | 5 | 0 | 0 | 0 |

Based on the index, an embodiment of the present invention can determine the cardinality (Card) which in this case is four since there are only four different products occurring in our event instances. The Cnt for the Product attribute is in this case 5 as it occurs in every event. It should be noted that this might not always be the case. With the index the embodiment of the present invention can determine the AvgAttributeLength for the Product. In this simple example the variance of the product names is zero and the AvgAttributeLength is 8. The type inference component also utilizes the index to determine the type (which is alphanumeric).

The next step is to compute correlation candidates on the basis of the computed statistics.

Determining Correlation Candidates

At this point data has been loaded into the storage and various statistics have been calculated for each type and attribute of events. This provides a foundation for determining the correlation candidates. The goal of the method of candidate matching is to utilize the statistics within certain boundaries (parameters) to present a result set containing pairs of potentially correlating attributes expressed by a confidence score according to an embodiment of the present invention. This has the advantage of allowing a user to specify approximate parameters and select desired candidates through a user interface. In a fully automated solution a system can select candidates with a very high confidence factor. The confidence score of correlation candidates can be determined by the following three parameters with a default set of weights:
(a) Difference Set. A difference set determines the difference between all permutations of pairs of all attribute candidates on their instance data and is assigned a weight of 60%.
(b) Difference between AvgAttributeLength. The difference between the lengths of values of two correlation candidates is assigned a weight of 20%.
(c) LevenshteinDistance. The Levenshtein distance between attribute names is assigned a weight of 20%

An embodiment of the present invention can determine the weights for each parameter experimentally.

Difference Set. The first step in computing the confidence score is to compute the difference set of all permutations of pairs of all attribute candidates. To reduce the search space of candidates, an embodiment of the present invention can determine Highly Indexable Attributes for each type and then Mappable Attributes to form pair candidates. A Highly Indexable Attribute is an attribute that is potentially unique for each instance of a type. This attribute can be determined by the following equation:

$$\text{IndexableAttributeSet} := \{i | i \in \text{Attributes} \wedge (\text{Card}(i) / \text{Cnt}(i)) > \text{Alpha} \wedge \text{AvgAttribtueLength}(i) > \text{Epsilon}\}$$

Alpha is a threshold parameter that determines the minimum ratio (i.e. uniqueness) of Card/Cnt and thus allows a small deviation that can be caused for instance by duplicates. Epsilon is an additional parameter that defines the minimum average length of an attribute. The Mappable Attribute can be seen as a means to reduce the search space of potentially correlating attributes of a type. One approach is to set an upper threshold of how frequently a value of an attribute can occur according to an embodiment of the present invention. The assumption is that if it occurs more than x times it is unlikely that it is a correlation candidate. Consider for example an order relation that contains one unique key. Customer complaints are stored into a separate relation containing the order-key as a reference. We assume that a complaint cannot occur more than 10 times for one order. The Mappable Attribute can be defined as follows:

$$\text{MappableAttributeSet} := \{m | m \in \text{Attributes} \wedge \text{Card}(m) < \text{Gamma}\}$$

Gamma is a threshold parameter that can be set experimentally and customized to the application scenario based on knowledge of the events. This parameter bears the drawback of missing correlation candidates in some cases. For example, in a situation where a Customer has many Orders with a foreign-key relationship, it does not make sense to set a value for Gamma.

By determining all the Indexable and Mappable Attributes of all types the next step is to find candidates of pairs of attributes that potentially correlate with each other according to an embodiment of the present invention. Therefore a difference set $A \backslash B = \{x | x \in A \wedge x \notin B\}$ between all permutations of attribute candidates A and B is created where A=IndexableAttributeSet and B=MappableAttribute-Set. The size of A\B must be below a certain threshold in order to be taken into account:

$$|A \backslash B| <= \text{DiffThreshold}$$

Candidate pairs of the permutation mixes are excluded if they have a mismatch of data types based on the previously determined InferencedType. The DiffThreshold should be kept in a range between 80-90% for most cases depending on the domain. A difference, |A\B|, can occur for instance if there are a lot of process instances that are not finished (i.e. do not contain all expected correlations) at the point when the algorithm is applied. This may also be true when using a subset of events as a sample set to discover correlations. Depending on the domain and the event sources, sampling can become a hard problem. If correlation discovery is applied on a subset representing one week of data, for instance, it would be successful in identifying lower-level events that occur frequently in short timeframes. This means that instances have a good likelihood of being discovered. On the other hand for long-lasting processes that span several weeks or months certain events might not be well represented in such a data sample. Therefore it is important to configure the DiffThreshold parameter based on knowledge of the scenario.

Difference between AvgAttributeLength. The second weighting factor for the confidence is the difference between the AvgAttributeLength of two correlation candidates. If the difference between attribute lengths has a strong variance it may indicate that they do not share significant relationships.

LevenshteinDistance. The last parameter that influences the computation of the confidence score is the Levenshtein distance between the names of two attributes. Attribute names from different sources might have the same or comparable names if they have the same meaning. For example, in one system the attribute that contains the identifier for an order is named OrderId and in the other it is named order-id.

In the transportation example described in the *Statistics Calculation* Section, the statistics for the OrderReceived event were determined. Using the three steps described in the previous section, the correlation candidates for the same example can determined. To simplify the example for better understanding, the focus will be on the OrderReceived and ShipmentCreated events.

| OrderReceived | DateTime | OrderId | Product | Amount | DeliveryUntil | CustomerId |
|---|---|---|---|---|---|---|
| Index | <<Map>> | <<Map>> | <<Map>> | <<Map>> | <<Map>> | <<Map>> |
| Card | 5 | 5 | 4 | 4 | 1 | 5 |
| Cnt | 5 | 5 | 5 | 5 | 5 | 5 |
| AvgAttributeLength | 22 | 6 | 8 | 1.2 | 22 | 8 |
| InferencedType | DateTime | Numeric | Alphanumeric | Numeric | DateTime | Numeric |
| NoOfNumeric | 0 | 5 | 0 | 5 | 0 | 5 |
| NoOfAlphaNumeric | 0 | 0 | 5 | 0 | 0 | 0 |

In the table above, the ratio of Card/Cnt is 0.8 for the Product and Amount attributes, 0.2 for DeliveryUntil and 1 for the rest of the attributes as all of their attribute values are unique. The threshold Alpha=0.9 and Epsilon=5. Therefore, the highly indexable attributes are DateTime, OrderId and CustomerId based on the formula Card/Cnt>Alpha ∧ AvgAttribtueLength>Epsilon.

|  | DateTime | ShipmentId | OrderId | Carrier |
|---|---|---|---|---|
| Index | <<Map>> | <<Map>> | <<Map>> | <<Map>> |
| Card | 5 | 5 | 5 | 3 |
| Cnt | 5 | 5 | 5 | 5 |
| AvgAttributeLength | 22 | 6 | 6 | 13.2 |
| InferencedType | DateTime | Numeric | Numeric | Alpha-numeric |
| NoOfNumeric | 0 | 5 | 5 | 0 |
| NoOfAlphaNumeric | 0 | 0 | 0 | 5 |

The table above contains the statistics for ShipmentCreated events. In this domain it might be unlikely that a shipment has more than 10 orders. However this might cause problems in other domains or for certain relationships (one customer definitely has more than 10 orders). Therefore, an embodiment of the present invention can set Gamma=10 and as Card<Gamma applies for all attributes, they are all flagged as mappable attributes. Finally, the attributes DateTime are removed from the candidate list from both OrderReceived and ShipmentCreated as they are of type DateTime and thus they are not suitable for correlation pairs. This also applies for booleans and de-scription texts. Now a pruned list of attributes exists which are potential correlation identifiers for each type which allows the embodiment of the present invention to create a list of all permutations of possible correlation rules.

```
OrderReceived.OrderId = ShipmentCreated.ShipmentId
OrderReceived.OrderId = ShipmentCreated.OrderId
OrderReceived.CustomerId = ShipmentCreated.ShipmentId
OrderReceived.CustomerId = ShipmentCreated.OrderId
OrderReceived.CustomerId = ShipmentCreated.Carrier
```

Commutative rules can be removed from this list. In this case every attribute within a pair has the same type. If attributes are not of the same type they can also excluded from the list and thus the difference set is not calculated (such as the case for OrderReceived.OrderId=ShipmentCreated.Carrier).

Based on this list, the DifferenceSet for all correlation rules can be determined. The remaining list contains only one correlation rule:

OrderReceived.OrderId=ShipmentCreated.OrderId

Then the difference between the AvgAttributeLengths between the candidates can be determined as well as the LevenshteinDistance. The result can be a table with all correlation rule candidates containing the previously determined weight. In this reduced case there is only one candidate where DifferenceSet=0, AvgAttributeLengths=0 and the LevenshteinDistance=0. The confidence score can be calculated based on the weights (DifferenceSet=60%, AvgAttributeLengths=20%, LevenshteinDistance=20%) and is therefore 100% which means that OrderReceived.OrderId=ShipmentCreated.OrderId has a very significant correlation.

Figure 6:
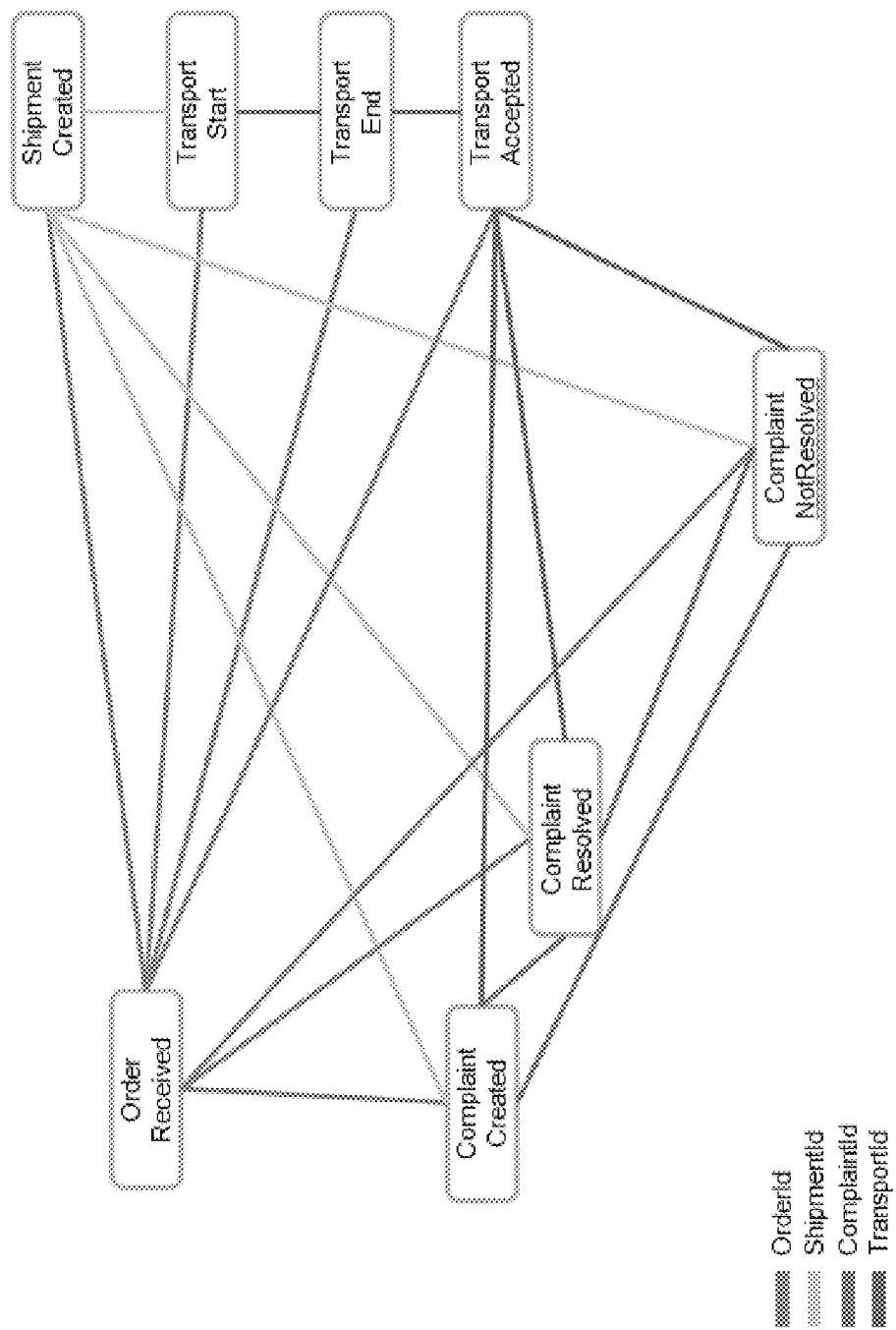
FIG. 6 shows an example of a set of discovered correlation rules which would be problematic for a human to consume and potentially serve as a performance bottle-neck when executed by a correlation engine.

FIG. 6 shows an example of a set of discovered correlation rules which would be problematic for a human to consume and potentially serve as a performance bottle-neck when executed by a correlation engine. The correlation rules (i.e. relationships between events) produced by the method of correlation discovery according to an embodiment of the present invention can be quite large and complex. This introduces two kinds of problems. First, complex rules can become difficult to understand, especially if the user wants to isolate specific characteristics such as a process (e.g. remove correlation rules that represent dimensions such as "by Region", "by Customer", etc). Second, if large sets of correlation rules are executed by a correlation engine, the engine needs more resources to compute the set of correlations which also has an impact on performance and space requirements. Fewer rules are faster to compute and, depending on the type of the correlation engine, the number of rules determines how many connections need to be maintained between events.

In this section a method that applies graph-based techniques to reduce the number of correlation rules while ensuring that the semantic correlation coverage of the remaining set of rules is the same as that of the original set of rules is presented as an embodiment of the present invention. The method works by first transforming a set of correlation rules into an undirected graph. In that graph, nodes represent events and the relationships between events are represented by edges. Next, weights are assigned to edges in the graph, and a minimum spanning tree algorithm is applied to extract a single spanning tree from the correlation rule graph. This results in a reduction in the number of correlation rules (i.e. edges) and ensures that the semantic correlation coverage of the rules in the spanning tree is not less than that of the rules in the original undirected graph. This problem cannot be solved by simply removing redundant paths (i.e. reducing the graph) because the semantic correlation coverage of the remaining rules may be reduced by such methods. The presented method according to an embodiment of the present invention takes the probability that an event occurs in combination with other events into account.

For 8 different event types a large number of correlation rules are found as can be seen in FIG. 6. Each edge represents a correlation rule such as the event type OrderReceived.OrderId=ShipmentCreated.OrderId. For the sake of simplicity the attribute names that correlate are the same in each event type in this example, which is not necessarily the case in reality. In a real world scenario the correlating attribute names could look like: OrderReceived.Order_id=ShipmentCreated.oid.

Figure 7:
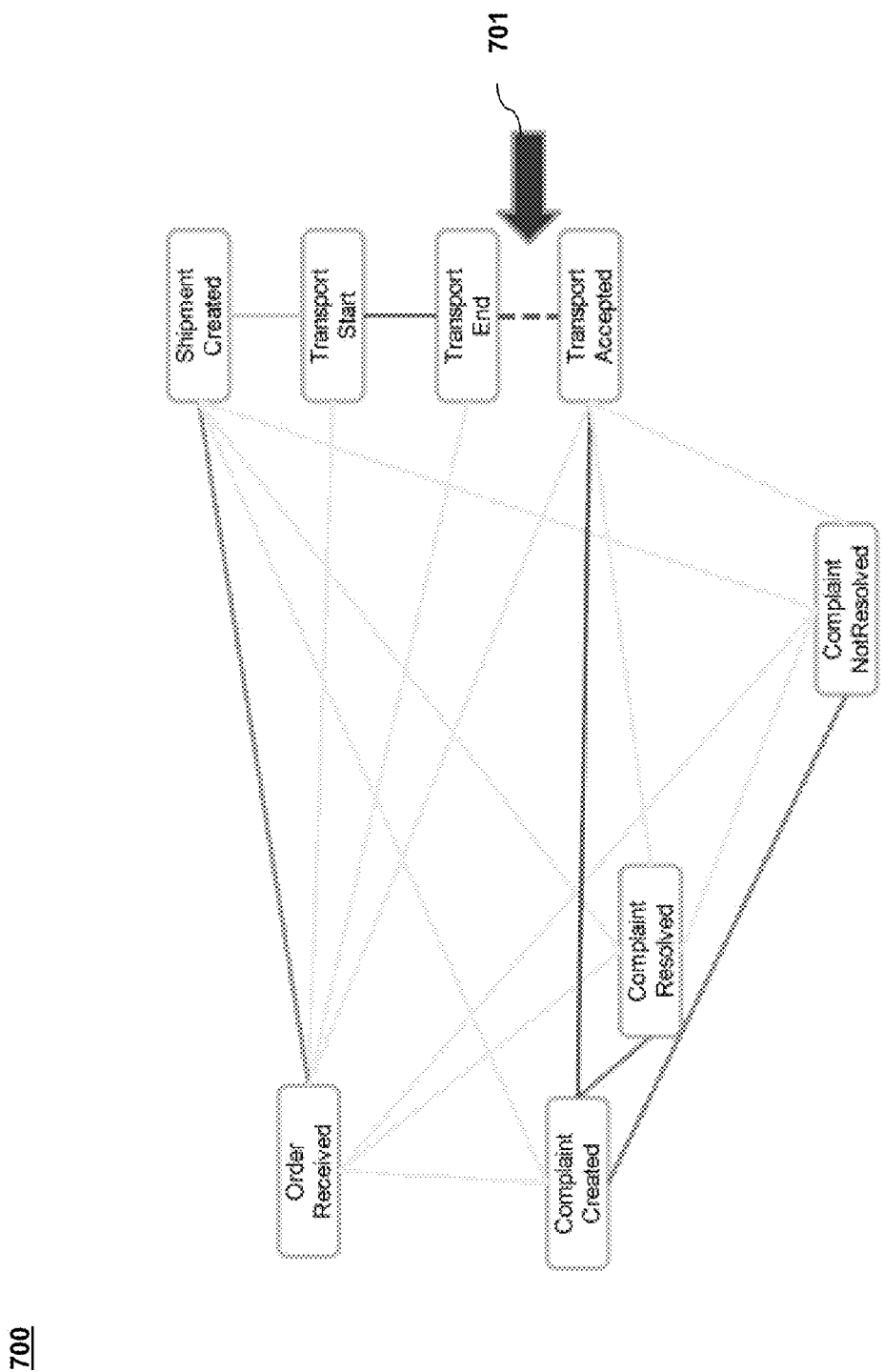
FIG. 7 shows an example of a graph simplified to remove all edges that are redundant in order to isolate a correlation graph that represents a process of interest according to an embodiment of the present invention.

The correlation graph in FIG. 6 is relatively complex and difficult to understand. A human user may simplify the graph by applying human reasoning and domain knowledge to remove all edges that are redundant, as shown in FIG. 7 in order to isolate a correlation graph that represents a process of interest. In FIG. 7 the event types are connected in a way that all nodes can be reached. Information about the probability with which events correlate with each other (i.e. an edge exists during runtime) is not present, however. Removing redundant edges while taking into account the probability that events connected by the edge correlate with each other is important and could greatly improve the effectiveness of the correlation rules reduction method.

Figure 8:
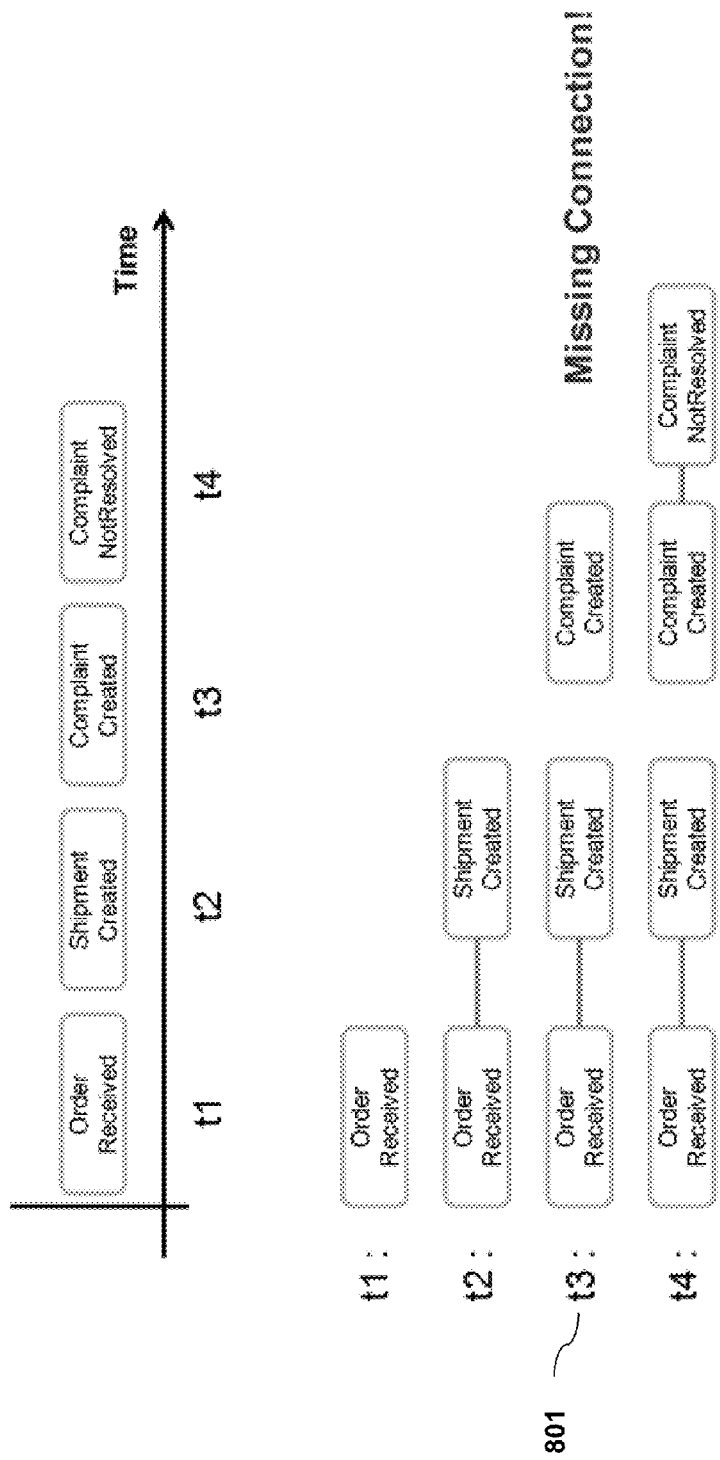
FIG. 8 shows example correlation of events during runtime where all events are not correlated.

Consider the example illustrated in FIG. 7. In this example not every transport is accepted (i.e. the TransportAccepted event does not always occur) as shown by 701, but a complaint (ComplaintCreated) might be filed at any given point in the process execution. As a result it is not possible to link the complaint to the order as the event TransportAccepted and thus the link to the rest of the events is missing. FIG. 8 illustrates this issue during run-time with event instances. It shows in t3 (801), a ComplaintCreated event has fired, but since the TransportAccepted event is missing it is not possible to correlate all the events.

Figure 9:
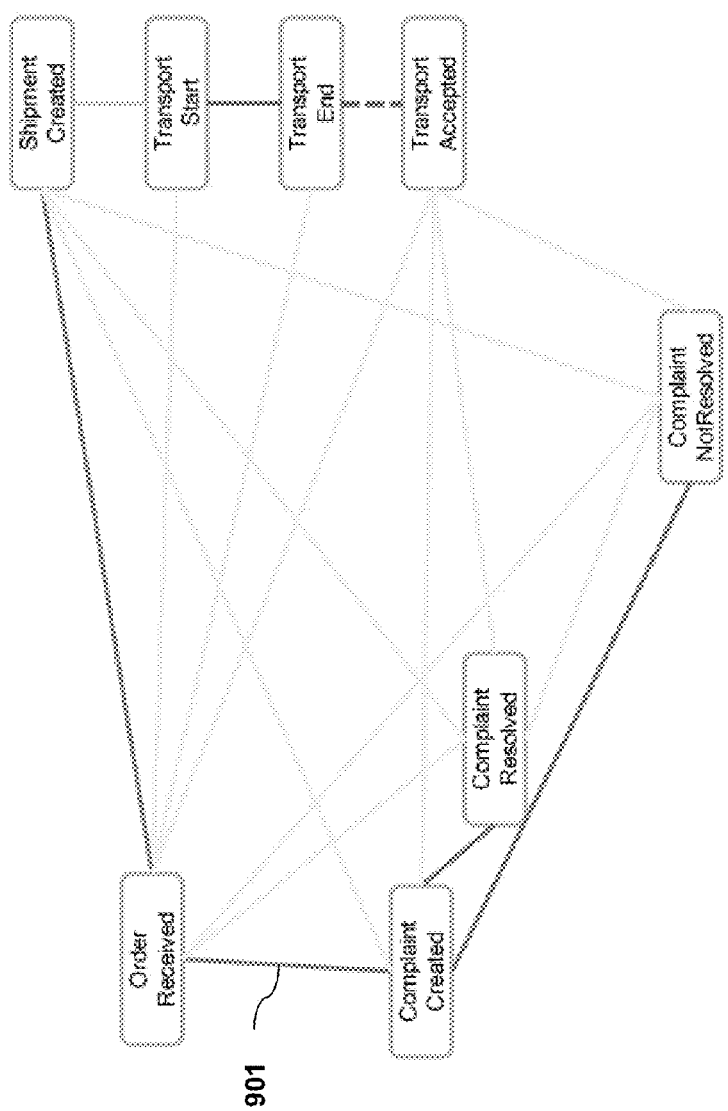
FIG. 9 shows an example of a graph simplified to remove redundant edges yet keeping paths to nodes (event types) that are 100% reachable according to an embodiment of the present invention.
Figure 10:
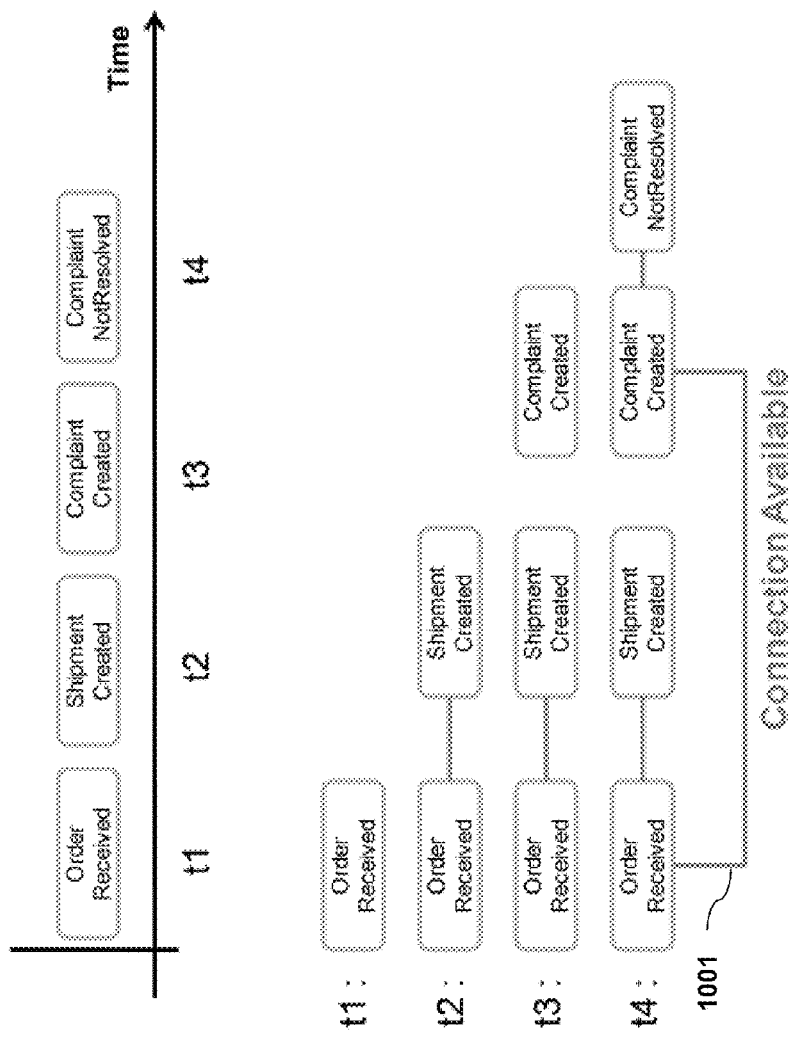
FIG. 10 shows example correlation of events during runtime where all events are correlated according to an embodiment of the present invention.

The probability with which correlated events occur in pairs is provided as part of the output of the method of correlation discovery according to an embodiment of the present invention and is referred to as the Difference Set described earlier. In that illustrative example, whenever a complaint has been filed there is always an order, which means that ComplaintCreated events occur 100% of the time in combination with OrderReceived events. Therefore, a preferred solution could be to remove edges that have uncertainty and keep paths to nodes (event types) that are 100% reachable as illustrated in FIG. 9. As the connection (path) between OrderReceived and ComplaintCreated has been kept (901) it is possible to correlate the events during runtime as can be seen in 1001 in FIG. 10.

Figure 11:
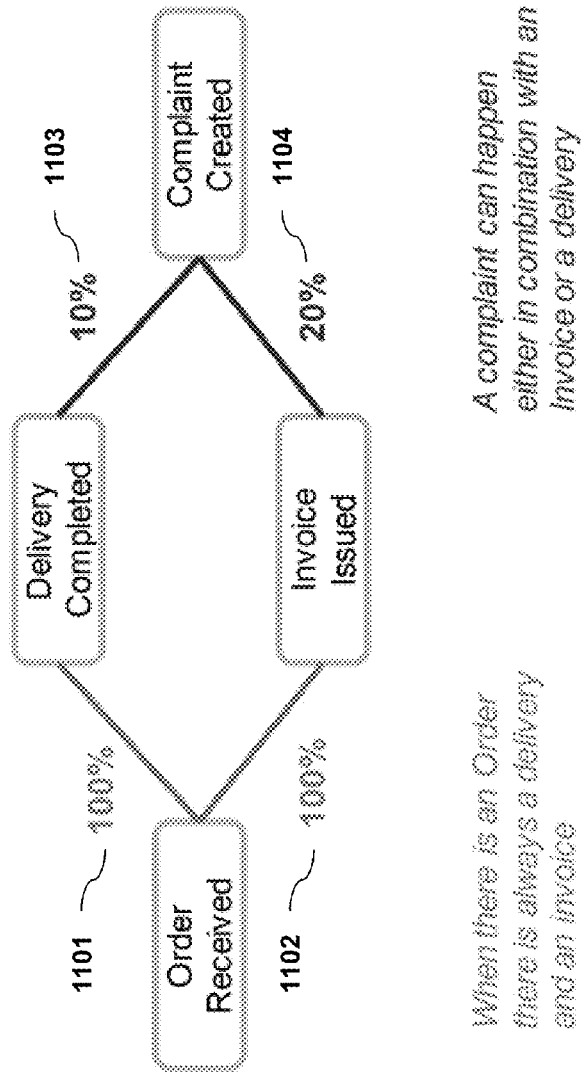
FIG. 11 shows a scenario where it is not possible to remove all uncertain paths or keep all paths with a high certainty.

In the examples shown in FIGS. 7-10, removing uncertain paths is an appropriate solution because it provides enough paths with 100% probability to reach all nodes from each node according to an embodiment of the present invention. In certain situations, however, such as the example illustrated in FIG. 11, it is not possible to remove uncertain paths or keep paths with a high certainty. The example shows that an OrderReceived event always occurs in combination with DeliveryCompleted and InvoiceIssued events 1101 and 1102 ("where there is an Order there is always a delivery and an invoice"). A complaint is not always created however as seen in 1103 and 1104, and does not always relate to the same event type ("A complaint happens either in combination with an invoice or a delivery").

The list of correlation rules shown in the following table express that in 10% of the cases a complaint refers to a delivery and in 20% of the cases a complaint refers to an invoice. Since they don't share the same correlation attributes (deliveryId vs. invoiceId) it is not possible to remove one of the uncertain rules because connections might be missed during runtime. A method that removes redundant edges must take this phenomenon into account.

| Correlation Rule | Probability |
| --- | --- |
| OrderReceived.orderId = DeliveryCompleted.orderid | 100% |
| OrderReceived.orderId = InvoiceIssued.orderId | 100% |
| DeliveryCompleted.deliveryId = InvoiceIssued.deliveryId | 10% |
| InvoiceIssue.invoiceId = ComplaintCreated.invoiceId | 20% |

Figure 12:
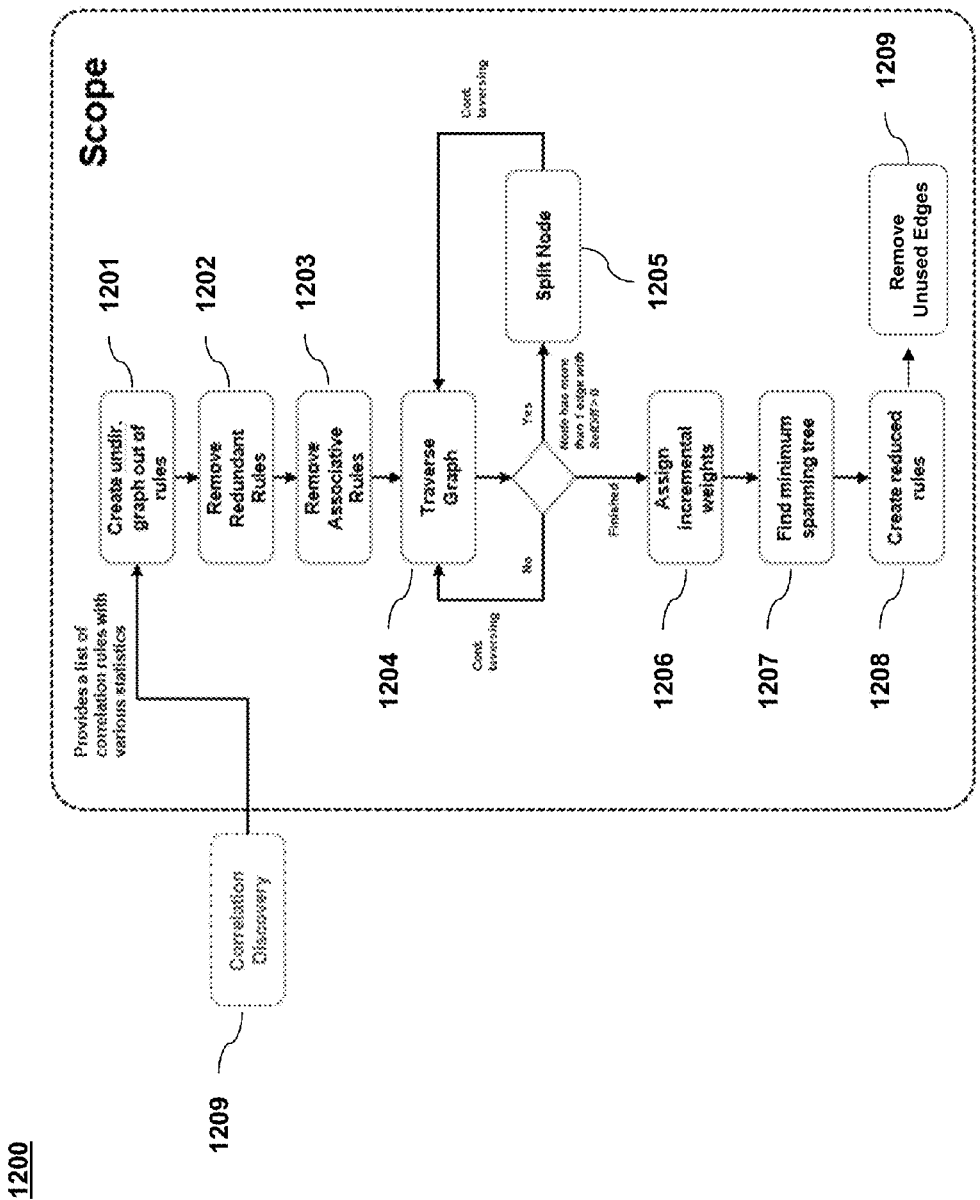
FIG. 12 a workflow diagram of a method of correlation reduction according to an embodiment of the present invention.

FIG. 12 is a workflow diagram of a method of correlation reduction according to an embodiment of the present invention. In the context of this graph reduction method the correlation discovery method 1209 introduced earlier (in FIGS. 4-11) can be seen as a black box that delivers a table similar to Table 1 with a list of rules and a probability of occurrence according to an embodiment of the present invention.

In the first step (1201 in FIG. 12) of the method an undirected graph is created out of a list of rules according to an embodiment of the present invention. Next, redundant and associative rules are removed (1202 and 1203 in FIG. 12) on the basis of factors such as probabilities. Next, the graph is traversed and nodes having more than one uncertain connection are split (1204 and 1205 in FIG. 12). The result is a graph where each node in the graph has at most one edge connected to it with a probability lower than 100%. Each edge is assigned a computed weight (i.e. cost) based on probabilities (1206 in FIG. 12). The calculation of weights is explained in more detail in FIGS. 14 and 15. This calculation can be designed with the aim to have only one graph as a result of applying a spanning tree algorithm according to an embodiment of the present invention (1207 in FIG. 12). Once the reduction is completed, the resulting graph can be transformed back to a list of correlation rules (1208 in FIG. 12).

The following is pseudo code of the method according to an embodiment of the present invention.

Method 1: Correlation Rule Reduction

```
 1: Input: A set of rules, R, created from correlation discovery
       algorithm in section 3.
 2: Output: A reduced set of correlation rules, R', where R' <= R.
 3: Create an undirected graph, G(V,E), where V is a set of vertices
       that consist of events, and E is a set of edges that consist of
       relationships between the events from R. Each edge e has a
       probability, p(e), and a weight, w(e), associated with it.
 4: Copy E and name it E'
 5: for i = 1 → |E| do
 6:    e(a,b) ← ith edge of E in G that connects vertex a to vertex b
 7:    for j = 1 → |E| do
 8:       e(c,d) ← jth edge of E in G that connects vertex c to vertex d
 9:       if a == c & b == d then // redundant rule
10:          E' ← E' \ e(c,d)
11:       else if a == d & b == c then //associative rule
12:          E' ← E' \ e(c,d)
13:       end if
14:    end for
15: end for
16: E ← E'
17: Copy V, and name it V'. Copy E, and name it E'
18: Let E_uncertain, E_certain be new empty sets of edges, and
       let V_new be a new empty set of vertices
19: for i = 1 → |V| do
20:    v ← ith element of V
21:    E(v) ← edges connected to v
22:    for j = 1 → |E(v)| do
23:       e ← jth edge of E(v)
24:       if p(e) < 100 then
25:          E_uncertain ← E_uncertain ∪ e
26:       else if p(e) == 100 then
27:          E_certain ← E_certain ∪ e
28:       end if
29:    end for
30:    if | E_uncertain | > 1 then
31:       V' ← V' \ v
32:       E' ← E' \ (E_uncertain ∪ E_certain)
33:       for j = 1 ← | E_uncertain | do
34:          e(v, a) ← jth edge of E_uncertain that connects vertex v
                to vertex a.
35:          k ← new vertex with index |V'|+j|
36:          E' ← E' ∪ e(k, a)
37:          V_new ← V_new ∪ k
38:       end for
39:       for j = 1 ← | E_certain | do
40:          e(v, a) ← jth edge of E_certain that connects vertex v
                to vertex a with probability 100
41:          for m = 1 ← | V_new | do
42:             b ← mth vertex in V_new
43:             E' ← E' ∪ e(b, a), where p(e(b, a)) = 100.
44:          end for
45:       end for
46:    end if
47: end for
48: V ← V' ∪ V_new
49: E ← E'
50: Let E_exp be a new empty set
51: Let z ← 0
52: Let y ← 2
53: for i = 1→ |E| do
54:    e ← ith edge in E
55:    Let w(e) ← weight of edge e
56:    w(e) = 100 − p(e)
57:    if w(e) == 0 then
58:       E_exp ← E_exp ∪ e
59:       w(e) ← y^z
60:       z ← z + 1
61:    end if
```

```
62: end for
63: for i = 1→ |E| do
64:     e ← ith edge in E
65:     if e ∉ E_exp then
66:         w(e) ← w(e) + y^z
67:     end if
68: end for
69: G' ← Kruskal_MST (G(V,E))
70: Determine R' from G'
```

Figure 13:
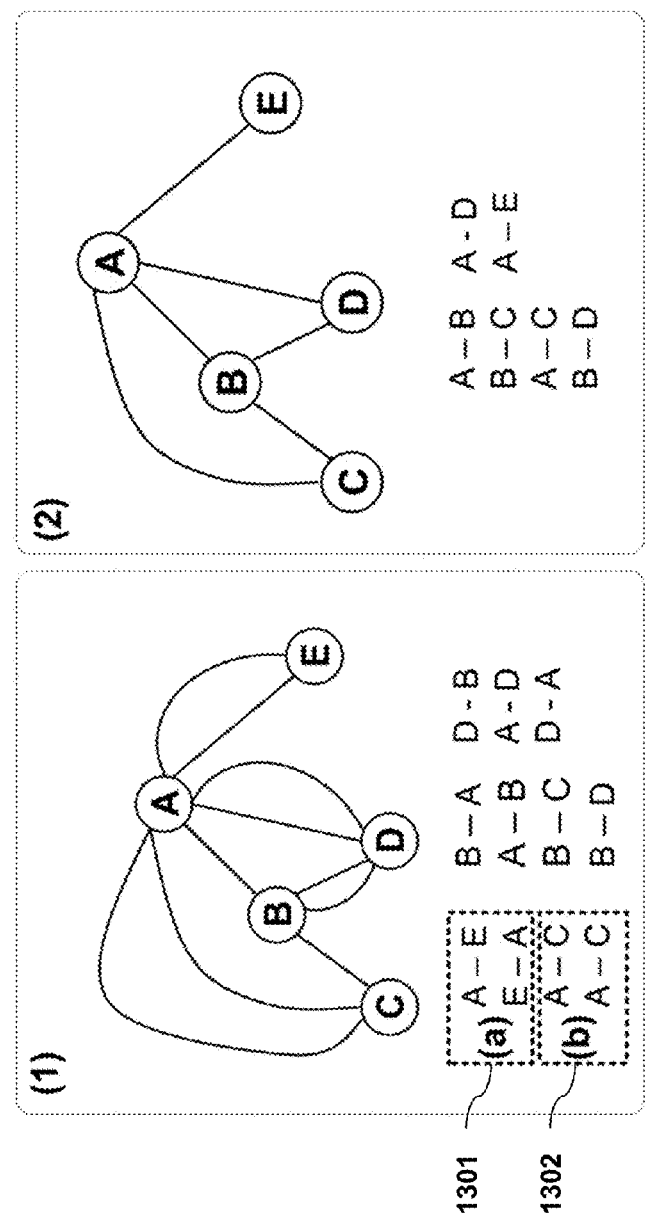
FIG. 13(1) represents a set of correlation rules with redundancies, and FIG. 13(2) represents a set of correlation rules without redundancies according to an embodiment of the present invention.

The previously mentioned steps for FIG. 12 will now be described in more detail. In step 1201 a graph is constructed from a set of correlation rules (line 3 in Method 1). For the sake of simplicity and to cover some exceptional situations a generic set of correlation rules has been chosen to explain the concepts of the algorithm. FIG. 13 (1) represents the set of correlation rules and each letter such as A, B, C, . . . represents an event type. Each node corresponds to an event type and each edge represents the defined correlation rule between two event types. There is no direction imposed on the edges in the graph.

Once the correlation graph has been constructed the next steps 1202 and 1203 are to remove redundant and associative rules (lines 4-14 in Method 1) according to an embodiment of the present invention. An example of an associative rule is shown in 1301 (FIG. 13 [1 a]) and a redundant rule is represented in 1302 (FIG. 13 [1 b]). If there is a set of redundant rules only the rules with a probability less than 100% are removed from the set provided that there is at least one other rule in the set that has a probability of 100%.

The same principle applies for removing associative relationships. One of the associative rules must have a probability of 100% and only the rule with a probability less than 100% can be removed.

Figure 14:
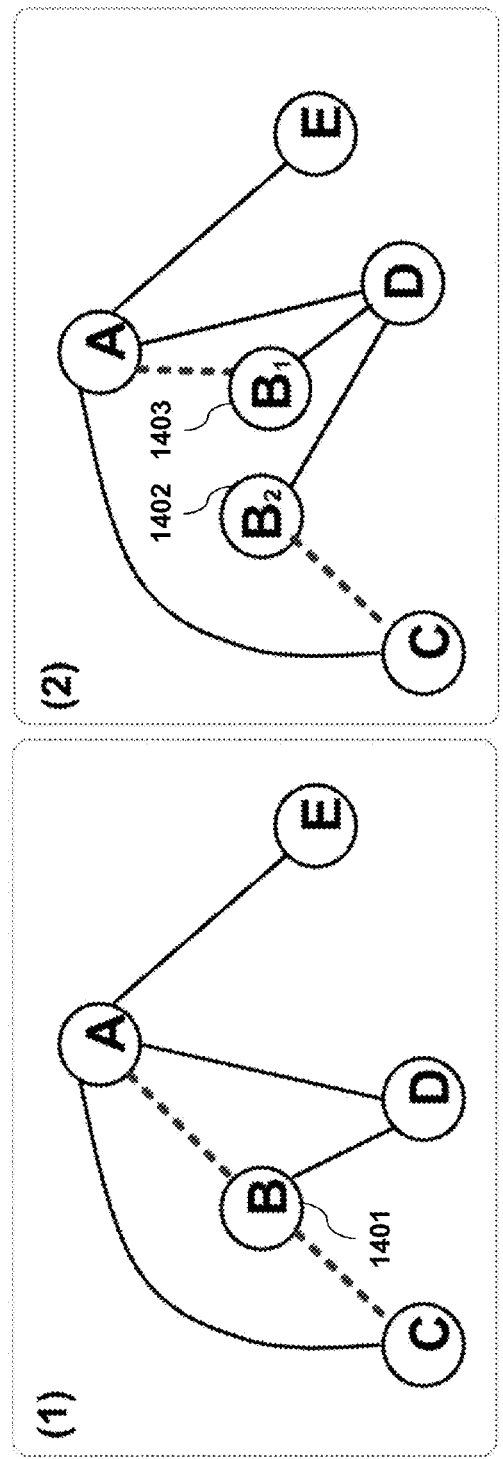
FIG. 14 shows an example of splitting a node according to an embodiment of the present invention.

In steps 1204 and 1205, the correlation graph is examined to determine whether it contains a node that has more than one edge with a probability of less than 100% (lines 17-27 in Method 1) according to an embodiment of the present invention. We refer to such a node as an uncertain node. In FIG. 14(1), 1401 (node B) is an uncertain node because it has two edges with a probability lower than 100%. For each edge having a probability lower than 100%, a new node can be created (lines 28-37 in Method 1) according to an embodiment of the present invention. For example in FIG. 14(2), the algorithm splits the uncertain node into two new nodes 1402 and 1403. All edges having a probability of 100% connected to the original uncertain node can also be connected to the newly created nodes (lines 38-44 in Method 1) according to an embodiment of the present invention. This is shown in the example in FIG. 14 (2) where two new nodes B1 (1403) and B2 (1402) are created from uncertain node B (1401). All edges originally connected to B (1401) with probability 100% are also connected to both newly created nodes. It should be noted that the "splitting" of nodes can also be accomplished by adding one new node and changing the edges accordingly to achieve the same effect.

Figure 15:
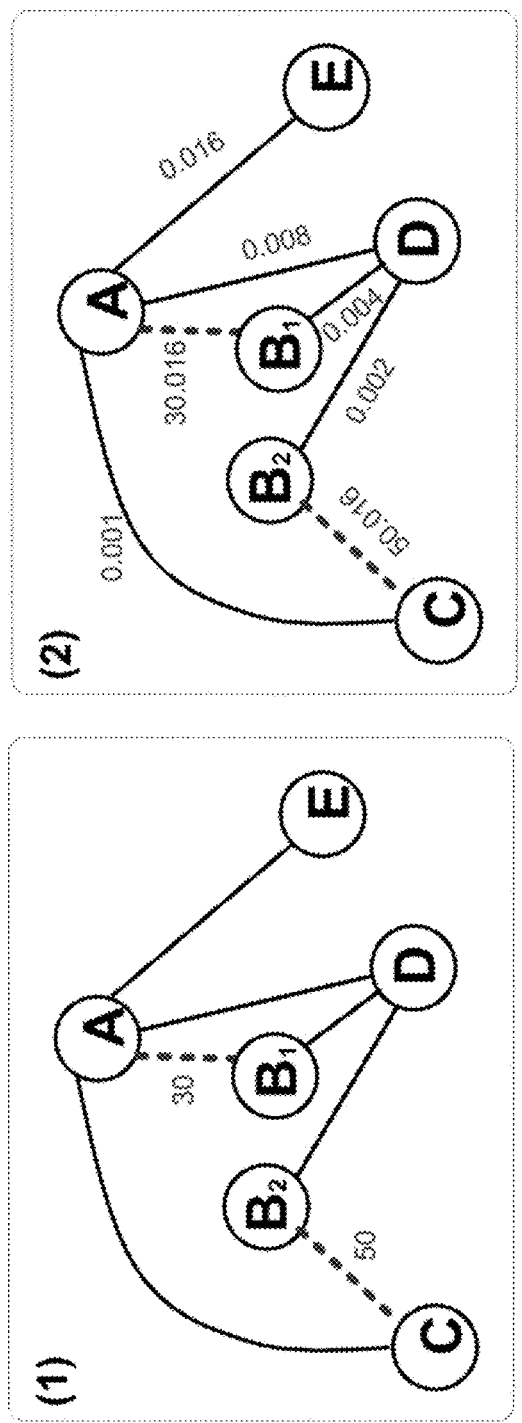
FIG. 15 shows an example of assigning weights according to an embodiment of the present invention.

After redundant and associative edges have been removed and node splits have been conducted, weights are assigned to all edges in step 1206 according to an embodiment of the present invention. Initially, all edges get the weight corresponding to |100-probability of the edge|, where the probability can be calculated by the correlation discovery (as a percentage). For instance, if a correlation rule (edge) has a probability of 100% the weight is 0 and if it is 70% then the weight is 30 as shown in FIG. 15 (lines 51-54 in Method 1) according to an embodiment of the present invention.

None of the edges are allowed to have the same weight. Therefore all edges with the weight 0 (probability of 100%, show by solid lines in FIG. 15) are assigned an exponentially growing weight (lines 55-59 in Method 1). The maximum of the exponential weight is then taken as an offset for all other weights that are greater than 0 (lines 61-66 in Method 1) as seen in FIG. 15(2). In other words the weight of each uncertain edge whose probability is less than 100% is larger than the maximum weight among the certain edges whose probability is 100%. Adding exponential weights is necessary for the minimum spanning tree algorithm in step 1207 of our graph reduction algorithm. Minimum spanning trees normally find more than 1 subgraph. Adding the introduced exponential weights restricts the minimum spanning tree algorithm to create one subgraph.

Figure 16:
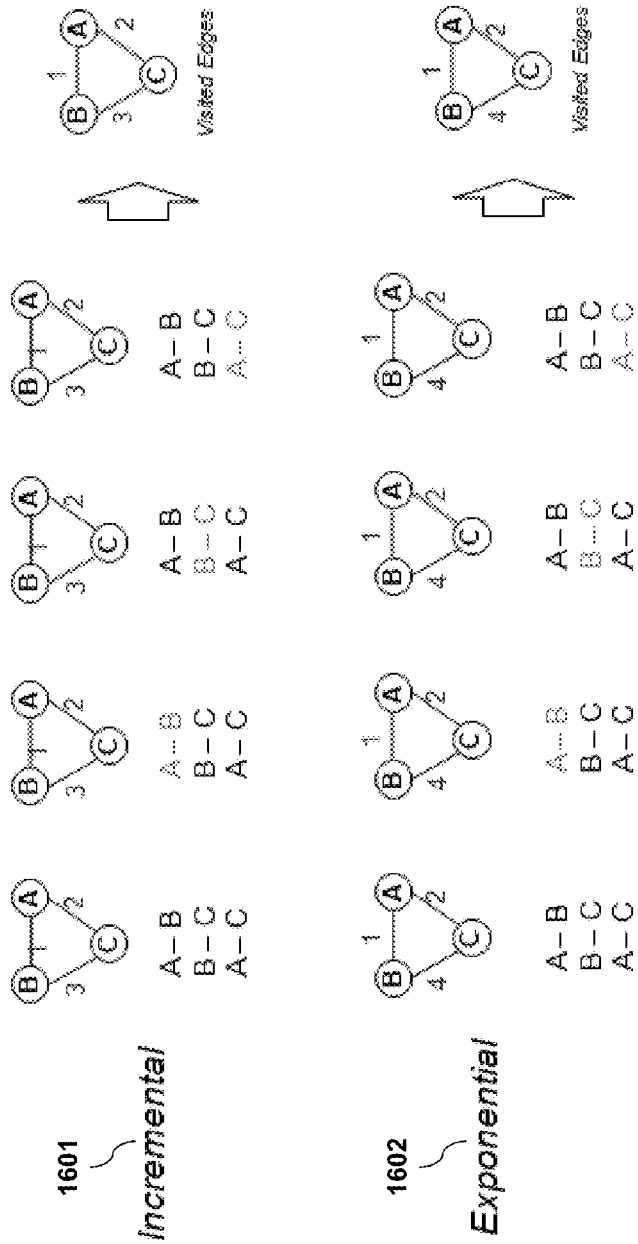
FIG. 16 compares incremental weights to exponential weights.

An example for this concept is illustrated in FIG. 16 where we consider exponential weights versus incremental weights. Given an edge $e_i$ with a certain cost $c_i$ an exponential growth of the assigned costs to all other edges has the effect that the sum of the costs of all other edges whose costs is lower than $c_i$ is smaller than $c_i$. Consider the Incremental example 1601 in FIG. 16. The shortest path from B to C is either over the path B→A→C or over the path B→C directly. Both paths have the same cost of 3. Since the spanning tree algorithm does not take the number of hops over nodes into account, it would generate two sub-graphs as the result. If the cost grows exponentially, however, there is always a path that is more expensive than the sum of all others. This case is highlighted in Exponential example 1602 in FIG. 16. In this example the shortest path from B to C is B→A→C which eliminates the connection B→C, resulting in a reduced graph.

Figure 17:
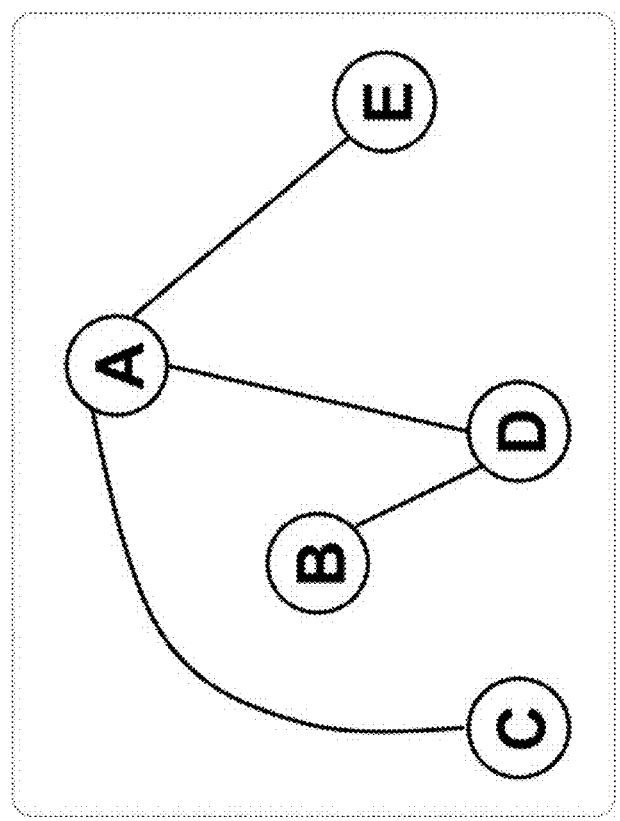
FIG. 17 an example of a modified undirected graph after a minimum spanning tree algorithm has been run on it according to an embodiment of the present invention.

In step 1207, Kruskal's algorithm can be used to compute a weighted minimum spanning tree for the connected weighted graph created in the previous steps (line 67 in Method 1) according to an embodiment of the present invention. Split nodes such as B1(1403) and B2 (1402) can be merged back to the original node. The resulting graph, shown in FIG. 17, can be translated back to correlation rules (line 68 in Method 1) in step 1208. It should be noted that edges that are not used by the minimum spanning tree algorithm can also be removed in step 1209.

Figure 18:
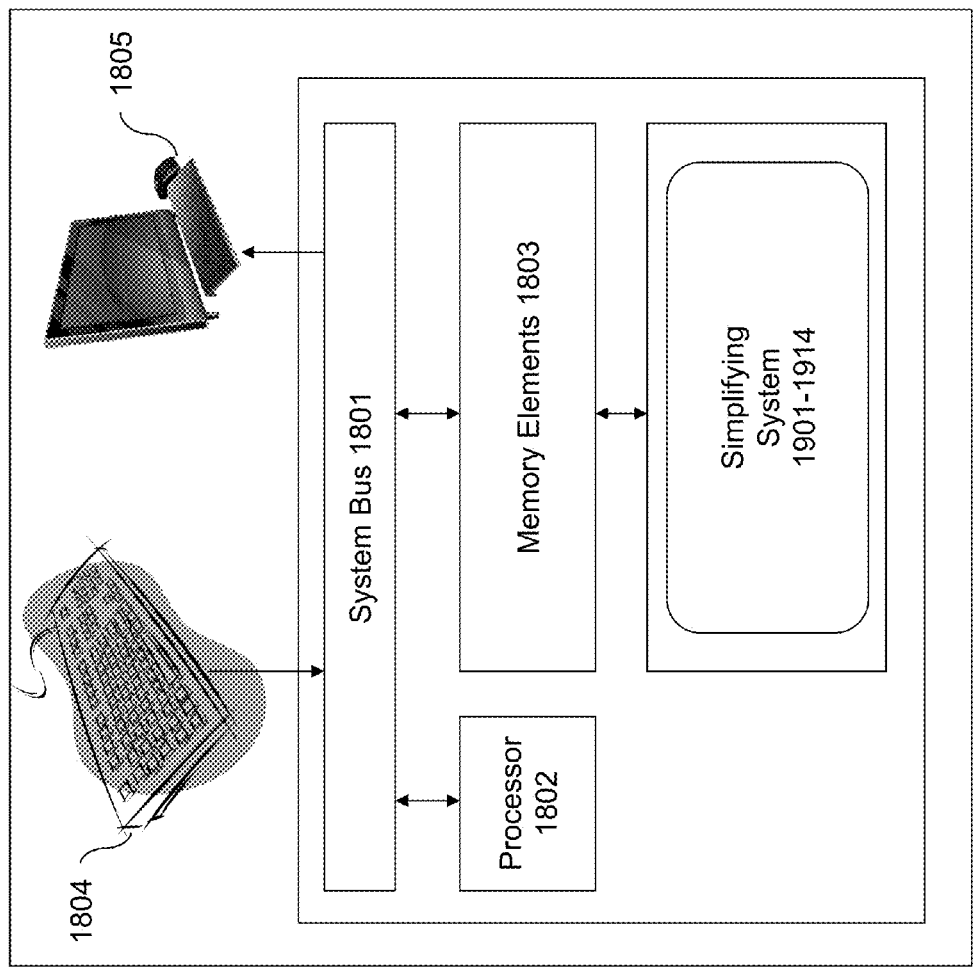
FIG. 18 is a block diagram of a Computer System for simplifying correlation rules of a graph according to an embodiment of the present invention.

FIG. 18 is a block diagram of a Computer System (hereinafter "system") 1800 for simplifying correlation rules of a graph according to an embodiment of the present invention. The system 1800 can include at least one processor 1802 coupled to memory elements 1803 through a system bus 1801. As such, the system 1800 can store program code within the memory elements 1803. The processor 1802 can execute the program code accessed from the memory elements 1803 via the system bus 1801. In one aspect, for example, the system 1800 can be implemented as computer that is suitable for storing and/or executing program code. It should be appreciated, however, that the system 1800 can be implemented in the form of any system including a processor and memory that is capable of performing the functions described within this specification.

The memory elements 1803 can include one or more physical memory devices such as, for example, local memory (not shown) and one or more bulk storage devices (not shown). Local memory refers to random access memory or other non-persistent memory device(s) generally used during actual execution of the program code. Bulk storage device(s) can be implemented as a hard disk drive (HDD), solid state drive (SSD) or other persistent data storage device. The system 1800 also can include one or more cache memories (not shown) that provide temporary storage of at least some program code in order to reduce the number of times program code must be retrieved from bulk storage device during execution.

Input/output (I/O) devices such as a keyboard 1804, a display 1805, and a pointing device (not shown) optionally can be coupled to the system 1800. The I/O devices can be coupled to the system 1800 either directly or through intervening I/O controllers. Network adapters also can be coupled to the system 1800 to enable the system 1800 to become coupled to other systems, computer systems, remote printers, and/or remote storage devices through intervening private or public networks. Modems, cable modems, and Ethernet cards are examples of different types of network adapters that can be used with the system 1800.

Figure 19:
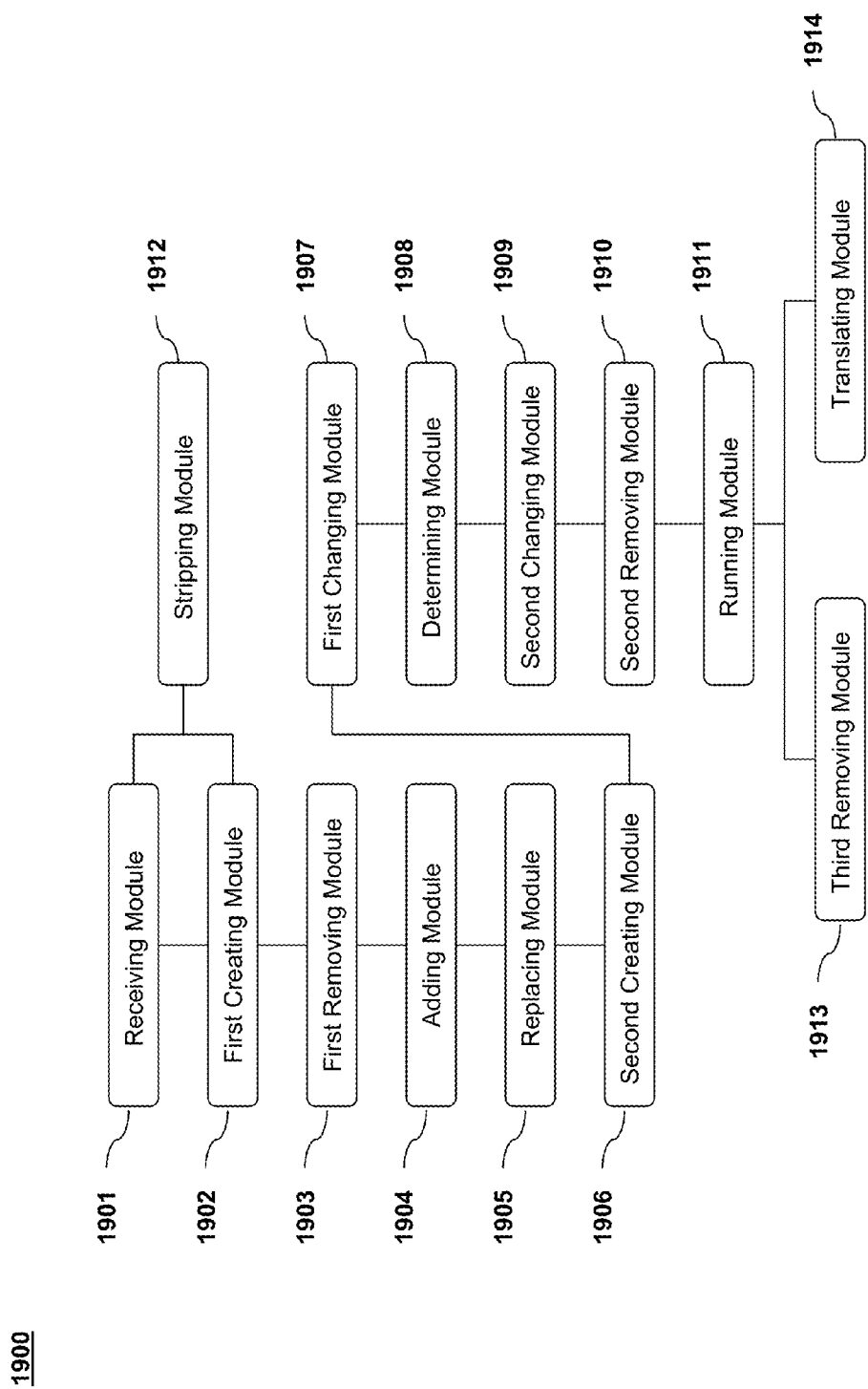
FIG. 19 shows a system for simplifying a plurality of correlation rules of a graph according to an embodiment of the present invention.

As pictured in FIG. 18, the memory elements 1803 can store the system 1800, including the Simplifying System 1901-1914, the Simplifying System being described in more detail in FIG. 19. The processor can execute the Simplifying System 1900 to implement the processes and methods described herein.

FIG. 19 is a diagram representing the Simplifying System 1900 for simplifying correlation rules of a graph according to an embodiment of the present invention. The system 1900 includes a receiving module 1901 which receives correlation rules as discussed in step 1209 of FIG. 12. A first creating module 1902 creates an undirected graph using correlation rules as discussed in step 1201 of FIG. 12. A first removing module 1903 removes redundant and associative rules as discussed in step 1202 of FIG. 12 and FIG. 13. An adding module 1904 adds a fifth node to the undirected graph when necessary as discussed in steps 1204 and 1205 of FIG. 12, as well as FIG. 14. A replacing module 1905 replaces uncertain edges with temporary uncertain edges and the second creating module 1906 creates temporary certain edges as discussed in step 1205 of FIG. 12 and FIG. 14. A first changing module 1907 and a second changing module 1909 changes probabilities for edges between nodes as described in step 1206 in FIG. 12 and FIG. 15. A determining module 1908 determines a maximum modified seed value (also described as "maximum of the exponential weight") as described in step 1206 of FIG. 12 and FIG. 15. A second removing module 1910 removes temporary edges as a result of merging split nodes together as described in step 1207 of FIG. 12 and FIG. 17. A running module 1911 runs a minimum spanning tree algorithm on the modified undirected graph as described in step 1207 of FIG. 12 and FIG. 17.

In addition, a stripping module 1912 can strip the direction and event type attributes from correlation rules as described in step 1201 in FIG. 12. A translating module 1914 translates a modified undirected graph (e.g. such as the graph depicted in FIG. 17) to a new set of correlation rules. A third removing module removes an unused edge from the modified undirected graph, is the unused edge is not used by the minimum spanning tree algorithm as described in step 1209 in FIG. 12.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method of simplifying a plurality of correlation rules of a graph, comprising:
receiving said plurality of correlation rules;
creating an undirected graph using said plurality of correlation rules;
removing at least one edge from said undirected graph if (i) said at least one edge is an uncertain edge connecting a first node and second node and (ii) said first node and said second node are connected by a first certain edge;
adding a fifth node to said undirected graph if (i) a third node is connected to a fourth node by a second certain edge and (ii) said third node is connected to at least one other node by a plurality of uncertain edges;
replacing one of said plurality of uncertain edges which connects said third node to one of said at least one other node with a temporary uncertain edge which connects said fifth node to said one of said at least one other node;
creating a temporary certain edge which connects said fifth node to said fourth node;
for each certain edge or temporary certain edge, changing said certain edge or temporary certain edge to a modified certain edge by (i) replacing a probability that said certain edge or said temporary certain edge connects two nodes to a seed value, (ii) modifying said seed value by adding a first value to said seed value and (iii) adding a second value to said first value;
determining a maximum modified seed value wherein said maximum modified seed value was assigned to said modified certain edge;
changing each uncertain edge and temporary uncertain edge to a modified uncertain edge by adding said maximum modified seed value to a probability that said uncertain edge or said temporary uncertain edge connects two nodes;

removing said modified temporary certain edge; and running a minimum spanning tree algorithm on said modified undirected graph;

wherein at least one of the steps is carried out using a computer device.

2. The method according to claim 1 wherein said undirected graph is created by stripping direction and event type attributes from said received correlation rules.

3. The method according to claim 1 further comprising the step of translating said modified undirected graph into at least one new correlation rule.

4. The method according to claim 1 wherein said minimum spanning tree algorithm is a Kruskals Minimum Spanning Tree algorithm.

5. The method according to claim 1 wherein said second value is determined by an exponential weighting algorithm.

6. The method according to claim 1 further comprising the step of:

removing an unused edge from said modified undirected graph, if said unused edge is not used by said minimum spanning tree algorithm.

7. A computer implemented system for simplifying a plurality of correlation rules of a graph, comprising:

a receiving module configured to receive said plurality of correlation rules;

a first creating module configured to create an undirected graph using said plurality of correlation rules;

a first removing module configured to remove at least one edge from said undirected graph if (i) said at least one edge is an uncertain edge connecting a first node and second node and (ii) said first node and said second node are connected by a first certain edge;

an adding module configured to add a fifth node to said undirected graph if (i) a third node is connected to a fourth node by a second certain edge and (ii) said third node is connected to at least one other node by a plurality of uncertain edges;

a replacing module configured to replace one of said plurality of uncertain edges which connects said third node to one of said at least one other node with a temporary uncertain edge which connects said fifth node to said one of said at least one other node;

a second creating module configured to create a temporary certain edge which connects said fifth node to said fourth node;

a first changing module configured to change, for each certain edge or temporary certain edge, said certain edge or temporary certain edge to a modified certain edge by (i) replacing a probability that said certain edge or said temporary certain edge connects two nodes to a seed value, (ii) modifying said seed value by adding a first value to said seed value and (iii) adding a second value to said first value;

a determining module configured to determine a maximum modified seed value wherein said maximum modified seed value was assigned to said modified certain edge;

a second changing module configured to change each uncertain edge and temporary uncertain edge to a modified uncertain edge by adding said maximum modified seed value to a probability that said uncertain edge or said temporary uncertain edge connects two nodes;

a second removing module configured to remove said modified temporary certain edge; and a running module configured to run a minimum spanning tree algorithm on said modified undirected graph.

8. The system according to claim 7 further comprising a stripping module configured to strip direction and event type attributes from said received correlation rules.

9. The system according to claim 7 further comprising a translating module configured to translate said modified undirected graph into at least one new correlation rule.

10. The system according to claim 7 wherein said running module uses a Kruskals Minimum Spanning Tree algorithm.

11. The system according to claim 7 wherein said first changing module uses an exponential weighting algorithm to determine said second value.

12. The system according to claim 7, further comprising:

a third removing module configured to remove an unused edge from said modified undirected graph, if said unused edge is not used by said minimum spanning tree algorithm.

13. A non-transitory computer readable storage medium tangibly embodying a computer readable program code having computer readable instructions which when implemented, cause a computer to carry out the steps of a method comprising:

receiving said plurality of correlation rules;

creating an undirected graph using said plurality of correlation rules;

removing at least one edge from said undirected graph if (i) said at least one edge is an uncertain edge connecting a first node and second node and (ii) said first node and said second node are connected by a first certain edge;

adding a fifth node to said undirected graph if (i) a third node is connected to a fourth node by a second certain edge and (ii) said third node is connected to at least one other node by a plurality of uncertain edges;

replacing one of said plurality of uncertain edges which connects said third node to one of said at least one other node with a temporary uncertain edge which connects said fifth node to said one of said at least one other node;

creating a temporary certain edge which connects said fifth node to said fourth node;

for each certain edge or temporary certain edge, changing said certain edge or temporary certain edge to a modified certain edge by (i) replacing a probability that said certain edge or said temporary certain edge connects two nodes to a seed value, (ii) modifying said seed value by adding a first value to said seed value and (iii) adding a second value to said first value;

determining a maximum modified seed value wherein said maximum modified seed value was assigned to said modified certain edge;

changing each uncertain edge and temporary uncertain edge to a modified uncertain edge by adding said maximum modified seed value to a probability that said uncertain edge or said temporary uncertain edge connects two nodes;

removing said modified temporary certain edge; and running a minimum spanning tree algorithm on said modified undirected graph.

14. The computer readable storage medium according to claim 13 wherein said undirected graph is created by stripping direction and event type attributes from said received correlation rules.

15. The computer readable storage medium according to claim 13 further comprising the step of translating said modified undirected graph into at least one new correlation rule.

16. The computer readable storage medium according to claim 13 wherein said minimum spanning tree algorithm is a Kruskals Minimum Spanning Tree algorithm.

17. The computer readable storage medium according to claim 13 wherein said second value is determined by exponential weighting algorithm.

18. The computer readable storage medium according to claim 13 further comprising:
- removing an unused edge from said modified undirected graph, if said unused edge is not used by said minimum spanning tree algorithm.

* * * * *